(12) United States Patent
Keefer et al.

(10) Patent No.: US 6,398,853 B1
(45) Date of Patent: Jun. 4, 2002

(54) GAS SEPARATION WITH SPLIT STREAM CENTRIFUGAL TURBOMACHINERY

(75) Inventors: Bowie Gordon Keefer, Vancouver; Kevin Arnold Kaupert, Burnaby, both of (CA)

(73) Assignee: Quest Air Gases Inc. (CA)

( * ) Notice: Subject to any disclaimer, the term of this patent is extended or adjusted under 35 U.S.C. 154(b) by 0 days.

(21) Appl. No.: 09/464,446

(22) Filed: Dec. 16, 1999

(51) Int. Cl.[7] ................................................ B01D 53/06
(52) U.S. Cl. .............................. 96/125; 95/96; 95/101; 95/102; 95/105; 95/113
(58) Field of Search ........................... 95/96, 101, 102, 95/105, 113, 125, 100, 103, 97; 96/125

(56) References Cited

U.S. PATENT DOCUMENTS

| | | |
|---|---|---|
| 3,143,103 A | 8/1964 | Zuhn |
| 3,269,119 A | 8/1966 | Price |
| 3,757,492 A | 9/1973 | Graff |
| 3,781,126 A | 12/1973 | Benisek |
| 3,829,235 A | 8/1974 | Woollenweber, Jr. |
| 3,937,013 A | 2/1976 | Aspinwall |
| 3,953,147 A | 4/1976 | Aspinwall |
| 3,994,618 A | 11/1976 | Erickson |
| 4,612,022 A | 9/1986 | Berry |
| 4,957,523 A * | 9/1990 | Zarate et al. .................. 62/13 |
| 5,080,700 A | 1/1992 | Bergloff et al. |
| 5,105,616 A | 4/1992 | Bornemisza |
| 5,406,796 A | 4/1995 | Hiereth et al. |
| 5,441,559 A | 8/1995 | Petit et al. |
| 6,051,050 A * | 4/2000 | Keefer et al. .................. 95/96 |

FOREIGN PATENT DOCUMENTS

| | | |
|---|---|---|
| EP | 0 270 723 | 6/1988 |
| EP | 0 681 860 A2 | 3/1995 |
| EP | 0 853 967 A2 | 7/1998 |
| WO | WO 98/39563 | 11/1998 |
| WO | WO 9928013 | 6/1999 |

* cited by examiner

*Primary Examiner*—Robert A. Hopkins
(74) *Attorney, Agent, or Firm*—Katten Muchin Zavis

(57) ABSTRACT

A gas separation system for separating a feed gas mixture into a first gas component and a second gas component comprises a stator, and a rotor rotatably coupled to the stator. The stator includes a first stator valve face, a second stator valve surface, and a plurality of function compartments opening into the stator valve surfaces. The rotor includes a first rotor valve surface in communication with the first stator valve surface, and a second rotor valve surface in communication with the second stator valve surface. The rotor also includes a plurality of rotor flow paths for receiving gas adsorbent material therein for preferentially adsorbing the first gas component in response to increasing pressure in the rotor flow paths in comparison to the second gas component. Each rotor flow path includes a pair of opposite ends opening into the rotor valve faces for communication with the function compartments. Centrifugal turbomachinery is coupled to a portion of the function compartments, and includes an impeller which has a plurality of impeller flow paths for exposing each rotor flow path to a plurality of discrete pressures as the rotor rotates for separating the first gas component from the second gas component.

49 Claims, 15 Drawing Sheets

GAS SEPARATION WITH SPLIT STREAM CENTRIFUGAL TURBOMACHINERY

FIELD OF THE INVENTION

The present invention relates to centrifugal turbomachinery for use with gas separation systems. In particular, the present invention relates to split-stream centrifugal compressors, vacuum pumps and expanders in which the flow exiting or entering the centrifugal turbomachinery comprises multiple flows at different total pressures.

BACKGROUND OF THE INVENTION

Gas separation by pressure swing adsorption (PSA) is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed from a first end to a second end of the bed, and is reduced during intervals of flow in the reverse direction. As the cycle is repeated, the less readily adsorbed component is concentrated in the first direction, while the more readily adsorbed component is concentrated in the reverse direction.

Many prior art PSA systems have low energy efficiency, because feed gas for adsorber pressurization as well as for the high pressure production step is provided by a compressor whose delivery pressure is the highest pressure of the cycle. Energy expended in compressing the feed gas used for pressurization is then dissipated in throttling across valves over the instantaneous pressure difference between the adsorber and the high pressure supply. Similarly, in vacuum swing adsorption (VSA) where the lower pressure of the PSA cycle is established by a vacuum pump exhausting gas at that pressure, energy is dissipated in throttling over valves during countercurrent blowdown of adsorbers whose pressure is being reduced. A further energy dissipation occurs in throttling of light reflux gas used for purge, equalization, cocurrent blowdown and product pressurization or backfill steps. The energy dissipation in irreversible throttling becomes more important when such throttling takes place over larger pressure differences between an adsorber and a feed source or an exhaust sink.

Energy efficiency has been improved in more modern VSA air separation systems, by using feed compressors (or blowers) whose delivery pressure follows the instantaneous pressure of art adsorber being pressurized, and by using vacuum pumps whose suction pressure follows the instantaneous pressure of an adsorber undergoing countercurrent blowdown. In effect, the feed compressor rides each adsorber in turn to pressurize it with reduced throttling losses, and likewise the vacuum pump rides each adsorber in turn to achieve countercurrent blowdown with reduced throttling losses. In such systems, each feed compressor can only supply gas to a single adsorber at any time, and each vacuum pump can only exhaust a single adsorber at a time. The working pressure in each such feed compressor or vacuum pump will undergo large variations, stressing the machinery and causing large fluctuations in overall power demand. Further, compression efficiency is compromised by the unsteady operating conditions.

Since centrifugal or axial turbomachinery cannot operate under such unsteady conditions, rotary positive displacement machines are typically used in VSA systems. However, such machines have lower efficiency than modem centrifugal turbomachinery working under steady conditions, particularly for larger plant ratings (e.g. 50 tons per day oxygen VSA systems). Further, scale up above single train plant capacities of about 80 tons per day oxygen is inhibited by the maximum capacity ratings of single rotary machines.

Other modem VSA air separation systems have used multiple individual impellers to increase the enthalpy of the individual streams. However, these latter systems increase system complexity and capital cost. Furthermore, machine efficiency is reduced since the flow rates are smaller for each machine.

Accordingly, there is a need for centrifugal turbomachinery which can be used in PSA and VSA gas separation processes for maintaining steady conditions of gas flow and pressure, while minimising energy dissipation in irreversible throttling.

SUMMARY OF THE INVENTION

According to the invention, there is provided a gas separation system which addresses the deficiencies of the prior art gas separation systems.

As herein mentioned, the term "centrifugal turbomachinery" includes centrifugal compressors, vacuum pumps and expanders.

The gas separation system, according to the invention, separates a feed gas mixture into a first gas component and a second gas component and comprises a stator, and a rotor rotatably coupled to the stator. The stator includes a first stator valve face, a second stator valve surface, and a plurality of function compartments opening into the stator valve surfaces. The rotor includes a first rotor valve surface in communication with the first stator valve surface, and a second rotor valve surface in communication with the second stator valve surface. The rotor also includes a plurality of rotor flow paths for receiving gas adsorbent material therein for preferentially adsorbing the first gas component in response to increasing pressure in the rotor flow paths in comparison to the second gas component.

Each rotor flow path includes a pair of opposite ends opening into the rotor valve faces for communication with the function compartments. The gas separation system also comprises centrifugal turbomachinery coupled to a portion of the function compartments. The centrifugal turbomachinery includes an impeller which has a plurality of impeller flow paths for exposing each rotor flow path to a plurality of discrete pressures as the rotor rotates for separating the first gas component from the second gas component.

In a first embodiment of the invention, the centrifugal turbomachinery comprises a split stream centrifugal compressor for delivering the feed gas mixture to the first stator valve surface at a plurality of different feed gas pressure levels. The centrifugal compressor comprises a gas inlet for receiving the feed gas mixture, a plurality of blades extending radially outwards from the axis of rotation of the impeller, and a channel disposed within the impeller in communication with the gas inlet and extending between adjacent pairs of the blades. The blades include a plurality of steps positioned at differing radial distances from the rotational axis and define impeller flow paths for ejecting the feed gas mixture from the channel at a plurality of different angular momentums. The centrifugal compressor also includes a plurality of diffusers in communication with the channel for providing gas flows at a plurality of different pressures. In one variation of the centrifugal compressor, instead of the blades having steps, the blades have respective blade angles which define the impeller flow paths.

In a second embodiment of the invention, the centrifugal turbomachinery comprises a split stream centrifugal vacuum pump for producing a first product gas from gas flows which are enriched in the first gas component and which are received at a plurality of different sub-atmospheric gas pressure levels from the first stator valve surface. In a third embodiment of the invention, the centrifugal turbomachinery comprises a split stream centrifugal expander for producing a first product gas at atmospheric pressure from gas flows which are enriched in the first gas component and which are received at a plurality of different superatmospheric exhaust gas pressure levels from the first stator valve surface. The centrifugal vacuum pump and the centrifugal expander are structurally similar to the centrifugal compressor except that the direction of gas flow through the impeller flow paths is reversed. In two variations, the centrifugal vacuum pump and the centrifugal expander are coupled to the centrifugal compressor for assisting the centrifugal compressor in delivering the feed gas mixture to the first stator valve surface.

In another embodiment of the invention, the centrifugal turbomachinery comprises a double-sided impeller, a plurality of blades extending radially outwards from the impeller, a first gas inlet and a first gas outlet communicating with a first side of the impeller, and a second gas inlet and a second gas outlet communicating with a second side of the impeller. A first channel is disposed within the first side of the impeller for passing gas between the first gas inlet and the first gas outlet, and a second channel is disposed within the second side of the impeller for passing gas between the second gas inlet and the second gas outlet, with the first and second channels each extending between adjacent pairs of the blades. This latter embodiment may be configured as a split stream centrifugal compressor, a split stream centrifugal vacuum pump and a split stream centrifugal expander with the different impeller flow paths being defined either by a stepped impeller or differing blade angles.

In operation, the feed gas is delivered to the rotor flow paths through the first rotor-stator valve surface pair, and the rotor is rotated at a frequency so as to expose the gas mixture in each rotor flow path to cyclical changes in pressure and direction of flow. These cyclical changes cause the more readily adsorbed component of the feed gas to be exhausted as heavy product gas from the first rotor-stator valve surface pair and the less readily adsorbed component to be delivered as light product gas from the second rotor-stator valve surface pair. To enhance gas separation, light reflux exit gas is withdrawn from the second rotor-stator valve surface pair and is returned after pressure letdown to the second rotor-stator valve surface pair.

In order for the flowing gas streams entering or exiting the centrifugal turbomachinery at each pressure level to be substantially uniform in pressure and velocity, the feed gas is delivered to the rotor flow paths through a plurality of incremental feed gas pressure levels, and the heavy product gas is exhausted from the rotor flow paths as countercurrent blowdown gas through a plurality of decremental exhaust gas pressure levels. Preferably, the light reflux exit gas is withdrawn from the rotor flow paths through a plurality of decremental light reflux exit pressure levels and returned to the rotor flow paths as light reflux return gas at pressure levels less than the respective light reflux exit pressure level. For thermally boosted energy recovery, heat exchangers may also be provided to reject heat of compression and to heat the countercurrent blowdown and the light reflux gas streams about to be expanded.

Preferably the rotor also has a large number of adsorbers such that several adsorbers are exposed to each pressure level at any given moment. During pressurization and blowdown steps, the pressures of the adsorbers passing through each of these steps converge to the nominal pressure level of each step by a throttling pressure equalization from the pressure level of the previous step experienced by the adsorbers. Flow is provided to the adsorbers in a pressurization step or withdrawn in a blowdown step by the centrifugal turbomachinery at the nominal pressure level of that step. Hence flow and pressure pulsations seen by the centrifugal turbomachinery at each intermediate pressure level are minimal by averaging from the several adsorbers passing through the step, although each adsorber undergoes large cyclic changes of pressure and flow.

BRIEF DESCRIPTION OF THE DRAWINGS

The preferred embodiments of the invention will now be described, by way of example only, with reference to the drawings, in which.

DETAILED DESCRIPTION OF THE PREFERRED EMBODIMENTS

To aid in understanding the invention, the pressure swing adsorption process and associated apparatus will be described first, in association with FIGS. 1 through 4. The invention will then be described, commencing with FIG. 5.

Figure 1:
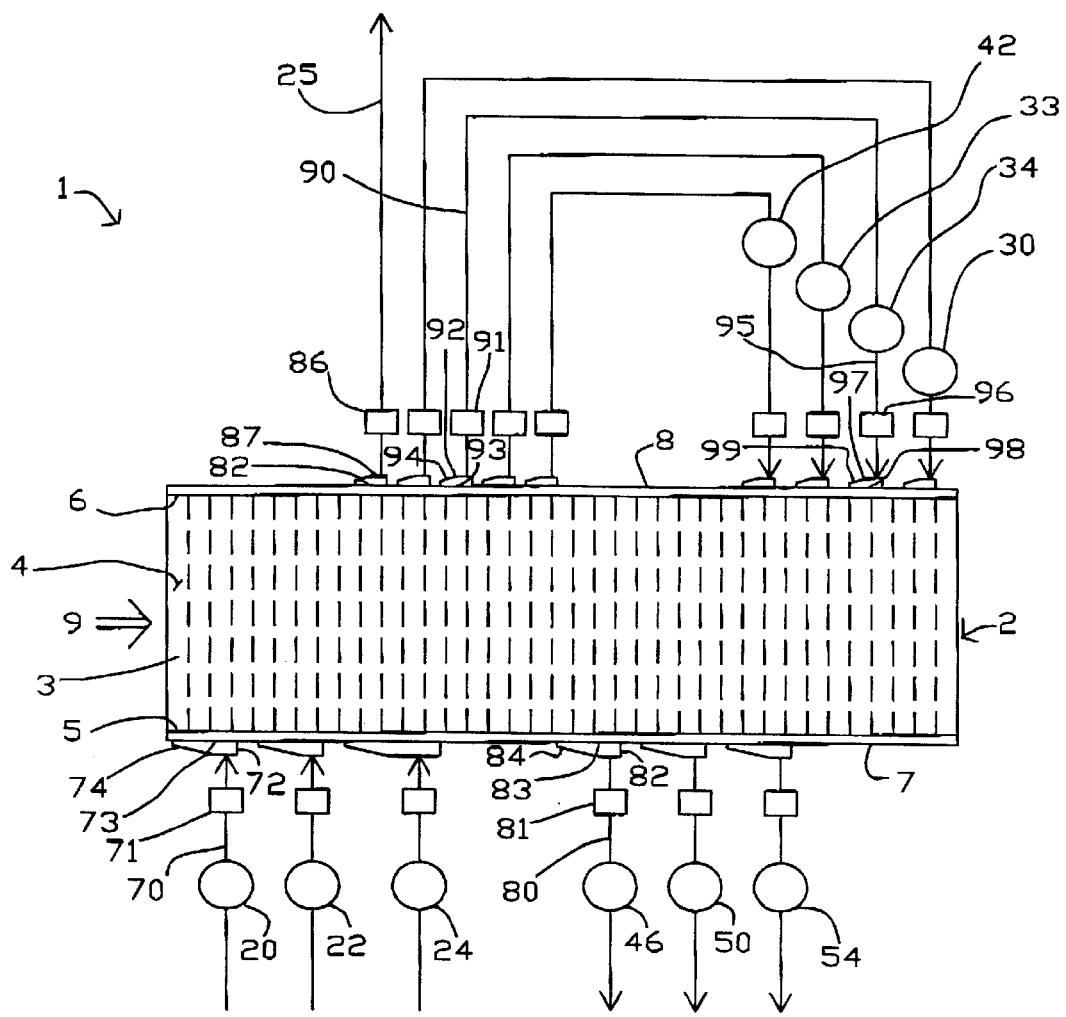
FIG. 1 shows a simplified schematic of a gas separation apparatus.
Figure 2:
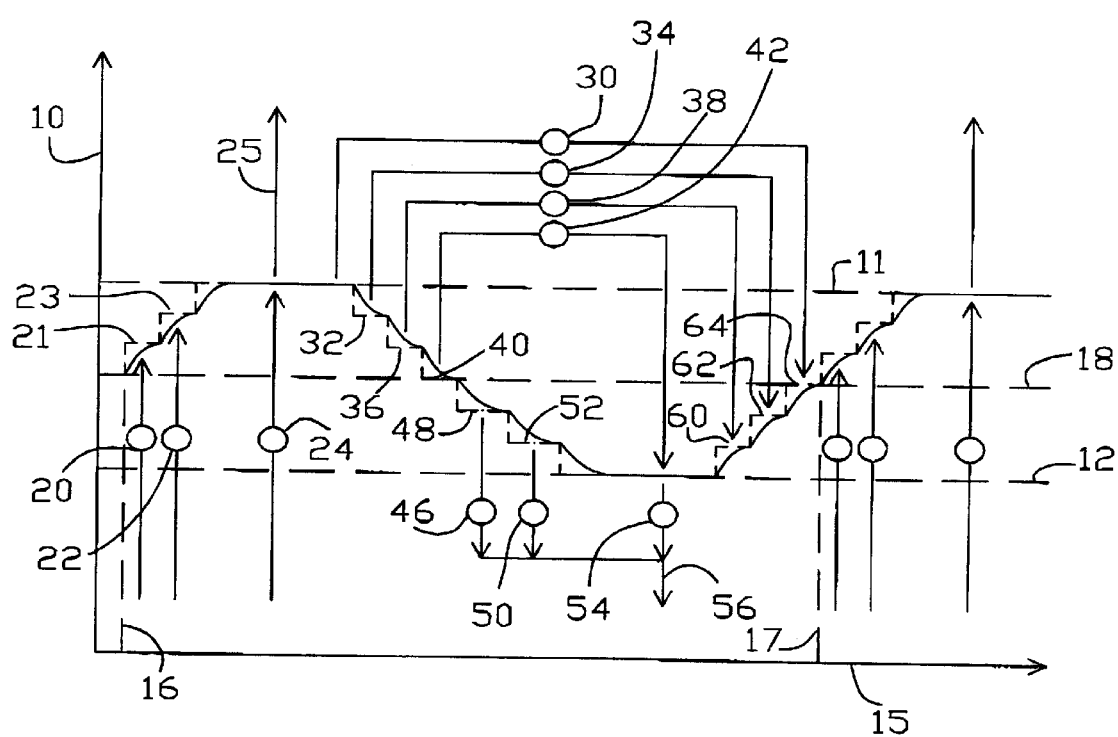
FIG. 2 shows a typical gas separation cycle, in the format to which the invention shall be applied.

FIGS. 1 and 2

FIG. 1 shows an elementary PSA apparatus 1 with an adsorber assembly 2 having a plurality of "N" cooperating adsorbers 3 in parallel. Each adsorber 3 has a flow path 4 between first end 5 and second end 6 of the adsorber 3, with adsorbent material contacting the flow path. Cooperating with the adsorbers are first valve 7 and second valve 8. Arrow 9 indicates the direction of progression of the adsorbers 3 in being connected to ports of the first and second valves 7, 8 as shown in FIG. 1. In the case of a rotary adsorber, as in the preferred embodiments of the invention, adsorber assembly 2 is shown in FIG. 1 unrolled in a 360° section about its rotary axis so that rotation causes the adsorbers 3 to advance in the direction of arrow 9 to undergo the cycle of FIG. 2.

FIG. 2 shows the PSA cycle undergone sequentially by each of the "N" adsorbers 3 over a cycle period "T". The cycle in consecutive adsorbers is displaced in phase by a time interval of T/N. In FIG. 2 the vertical axis 10 indicates the working pressure in the adsorbers and the pressures in the first and second compartments. Pressure drops due to flow within the adsorber elements are here neglected. The higher and lower working pressures of the PSA process are respectively indicated by dotted lines 11 and 12.

The horizontal axis 15 indicates time, with the PSA cycle period defined by the time interval between points 16 and 17. At times 16 and 17, the working pressure in adsorber 3 is pressure 18. Starting from time 16, the cycle begins as the first end 5 of adsorber 3 is opened by the first valve 7 to first feed mixture supply means 20 at the first intermediate feed pressure 21.

The pressure in that adsorber rises from pressure 18 at time 17 to the first intermediate feed pressure 21. Proceeding ahead, the first end 5 is opened next to second feed supply means 22 at the second intermediate feed pressure 23. The adsorber pressure rises to the second intermediate feed pressure.

Then the first end 5 is opened to a third feed supply means 24 at the higher pressure of the PSA process. Once the adsorber pressure has risen to substantially the higher working pressure, its second end 6 is opened by the second valve means to light product delivery conduit 25 to deliver purified light product. While feed gas is still being supplied to the first end of adsorber 3 from the third feed supply means, the second end 6 is next closed to light product delivery conduit 25, and is opened to deliver "light reflux" gas (enriched in the less readily adsorbed component, similar to second product gas) to first light reflux pressure let-down means (or expander) 30. All or some of the feed supply means may be feed compression stages. One of the feed supply means may be an external source, such as the ambient atmosphere for air purification or air separation applications.

The first end 5 of adsorber 3 is then closed by the first valve 7, while the second end 6 is opened successively by the second valve 8 to (a) drop the adsorber pressure to the first cocurrent blowdown pressure 32 while delivering light reflux gas to second light reflux pressure letdown means 34, (b) drop the adsorber pressure to the second cocurrent blowdown pressure 36 while delivering light reflux gas to third light reflux pressure letdown means 38, and (c) drop the adsorber pressure to the third cocurrent blowdown pressure 40 while delivering light reflux gas to fourth light reflux pressure letdown means 42. Second end 6 is then closed for an interval, until the light reflux return steps following the countercurrent blowdown steps.

The light reflux pressure let-down means maybe mechanical expansion stages for expansion energy recovery, or may be restrictor orifices or throttle valves for irreversible pressure let-down.

Either when the second end 6 is closed after the final light reflux exit step (as shown in FIG. 2), or earlier while light reflux exit steps are still underway, first end 5 is opened to first exhaust means 46, dropping the adsorber pressure to the first countercurrent blowdown intermediate pressure 48 while releasing "heavy" gas (enriched in the more strongly adsorbed component) to the first exhaust means 46. Next, first end 5 is opened to second exhaust means 50, dropping the adsorber pressure to the second countercurrent blowdown intermediate pressure 52 while releasing "heavy" gas. Then first end 5 is opened to third exhaust means 54, dropping the adsorber pressure to the lower pressure 12 of the PSA process while releasing "heavy" gas.

Once the adsorber pressure has substantially reached the lower pressure while first end 5 is open to the third exhaust means 54, the second end 6 is opened to receive fourth light reflux gas (as purge gas) from fourth light reflux pressure let-down means 42 in order to displace more heavy gas into the third exhaust means. The heavy gas from the first, second and third exhaust means may be delivered together as the heavy product 56. All or some of the exhaust means may be mechanical exhauster stages, alternatively either expansion stages if the pressure is to be reduced, or vacuum pumping stages if the pressure is to be increased to ambient pressure, or exhaust compression stages if the exhaust of second product is to be delivered at an elevated pressure. An exhaust means may also be provided by venting to an external sink, e.g. the ambient atmosphere.

The adsorber is then repressurized by light reflux gas after the first end 5 is closed. In succession, the second end 6 is opened (a) to receive light reflux gas from the third light reflux pressure reduction means 38 to raise the adsorber pressure to the first light reflux pressurization pressure 60, (b) to receive light reflux gas from the second light reflux pressure reduction means 34 to raise the adsorber pressure to the second light reflux pressurization pressure 62, and (c) to receive light reflux gas from the first light reflux pressure reduction means 30 to raise the adsorber pressure to the third light reflux pressurization pressure. Unless feed pressurization has already been started while light reflux return for light reflux pressurization is still underway, the process begins feed pressurization for the next cycle after time 17 as soon as the third light reflux pressurization step has been concluded.

From each feed supply means (e.g. 20), the feed flow is delivered by a conduit 70 through an optional surge absorber chamber 71 to a feed compartment 72 opening to a feed port 73 in first valve 7. Feed compartment 72 may be open to several adsorbers simultaneously, and may have a restricted entrance 74 so as to provide a gradual throttling equalization of pressure as each adsorber is opened to feed compartment 72.

To each exhaust means (e.g. 46), the exhaust flow is delivered by a conduit 80 through an optional surge absorber chamber 81 from an exhaust compartment 82 opening to an exhaust port 83 in first valve means 7. Exhaust compartment 82 may be open to several adsorbers simultaneously, and may have a restricted entrance 84 so as to provide a gradual throttling equalization of pressure as each adsorber is opened to exhaust compartment 82.

To light product delivery conduit 25, the light product is delivered through an optional surge absorber chamber 86 from light product exit compartment 87 opening to a light product port 88 in second valve 8.

To each light reflux pressure letdown means (e.g. 34), the light reflux flow is delivered by a conduit 90 through an optional surge absorber chamber 91 from a light reflux exit compartment 92 opening to a light reflux exit port 93 in second valve 8. Light reflux exit compartment 92 may be open to several adsorbers simultaneously, and may have a restricted entrance 94 so as to provide a gradual throttling equalization of pressure as each adsorber is opened to light reflux exit compartment 92.

From each light reflux pressure letdown means (e.g. 34), the light reflux flow is delivered by a conduit 95 through an optional surge absorber chamber 96 to a light reflux entrance compartment 97 opening to a light reflux entrance port 98 in second valve means 8. Light reflux exit compartment 97 may be open to several adsorbers simultaneously, and may have a restricted entrance 99 so as to provide a gradual throttling equalization of pressure as each adsorber is opened to light reflux entrance compartment 97.

The rate of pressure change in each pressurization or blowdown step may thus be restricted by throttling in compartments of the first and second valve means, or by throttling in the ports at first and second ends of the adsorbers, resulting in the typical pressure waveform depicted in FIG. 2. Excessively rapid rates of pressure change would subject the adsorber to mechanical stress, while also causing flow transients which would tend to increase axial dispersion of the concentration wavefront in the adsorber. Pulsations of flow and pressure are minimized by having a plurality of adsorbers simultaneously transiting each step of the cycle, and/or by providing surge absorbers in the conduits connecting to the first and second valve means.

It will be evident that the cycle shown in FIG. 2 could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 3

Figure 3:
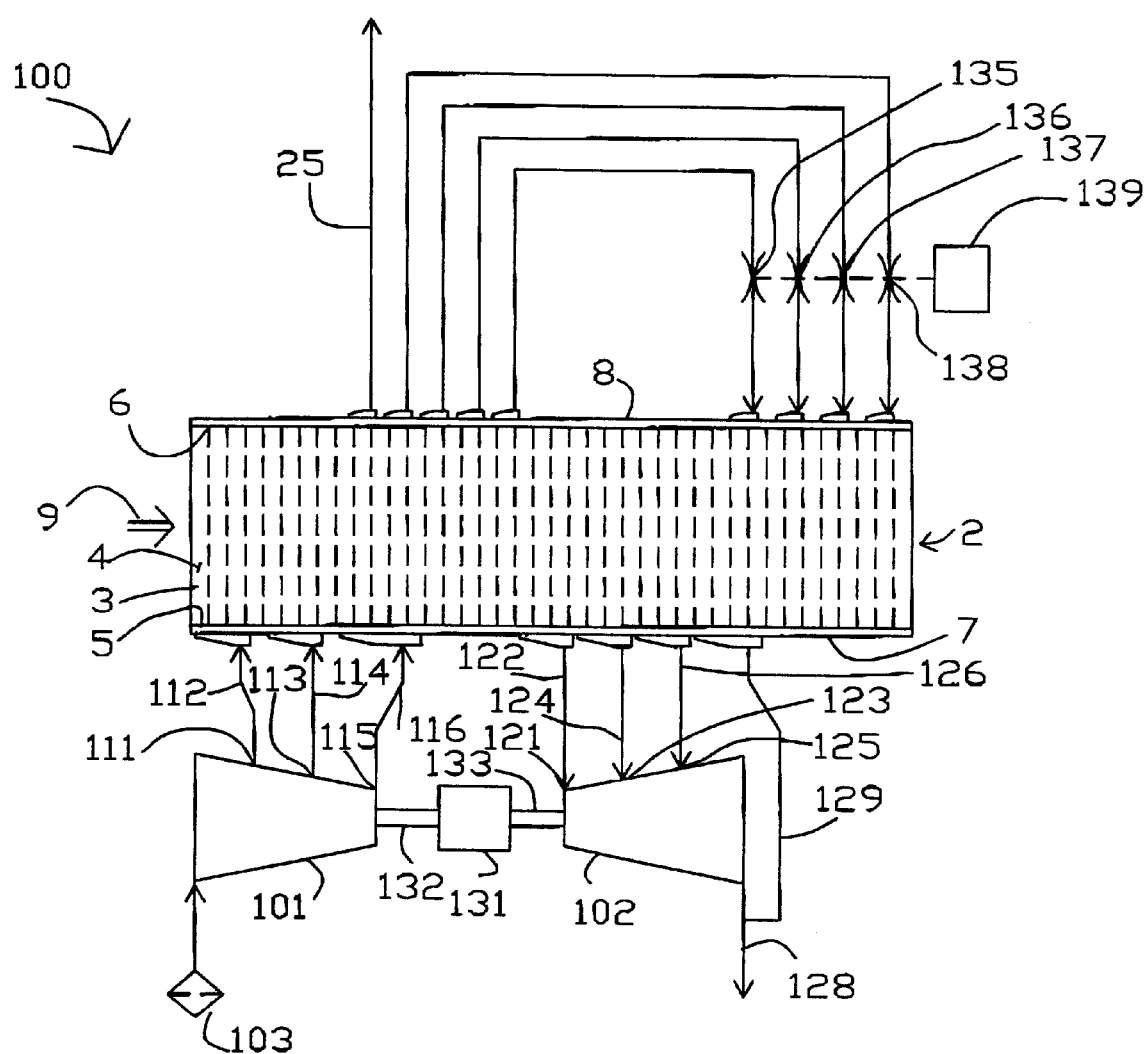
FIG. 3 shows a simplified schematic of a gas separation cycle apparatus using a split stream compressor and a split stream expander.

FIG. 3 shows a simplified schematic of a PSA air separation system 100, with a split stream centrifugal compressor 101, and a split stream countercurrent blowdown expander turbine 102. The PSA system has an inlet filter 103, and infeed conduit 104 to the suction port 105 of compressor 101.

Feed compressor 101 splits its discharge flow to three diffuser discharge ports, the first diffuser discharge port 111 delivering feed air at a first intermediate pressure to feed pressurization conduit 112, the second diffuser discharge port 113 delivering feed air at a second intermediate pressure to feed pressurization conduit 114, and the third diffuser discharge port 115 delivering feed air at the higher pressure of the cycle to feed production supply conduit 116.

Split stream expander 102 receives the countercurrent blowdown flow in three streams entering three nozzle ports, a first nozzle inlet port 121 receiving exhaust gas at a first countercurrent blowdown intermediate pressure from countercurrent blowdown conduit 122, a second nozzle inlet port 123 receiving exhaust gas at a second countercurrent blowdown intermediate pressure from countercurrent blowdown conduit 124, and a third nozzle inlet port 125 receiving exhaust gas at a third countercurrent blowdown intermediate pressure from countercurrent blowdown conduit 126. The combined exhaust gas is discharged as second product gas from outlet port 127 of expander 102 to conduit 128, and may be combined with second product gas discharged at the lower pressure of the cycle substantially equal to atmospheric pressure by exhaust conduit 129.

Feed compressor 101 is driven by motor 131 through shaft 132. Expander 102 may be coupled by shaft 133 to assist powering compressor 101.

In the option of light reflux pressure let-down without energy recovery, throttle valves 135, 136, 137 and 138 provide pressure let-down for each of four light reflux stages illustrated. Actuator means 139 is provided to adjust the orifices of the throttle valves.

FIG. 4

Figure 4:
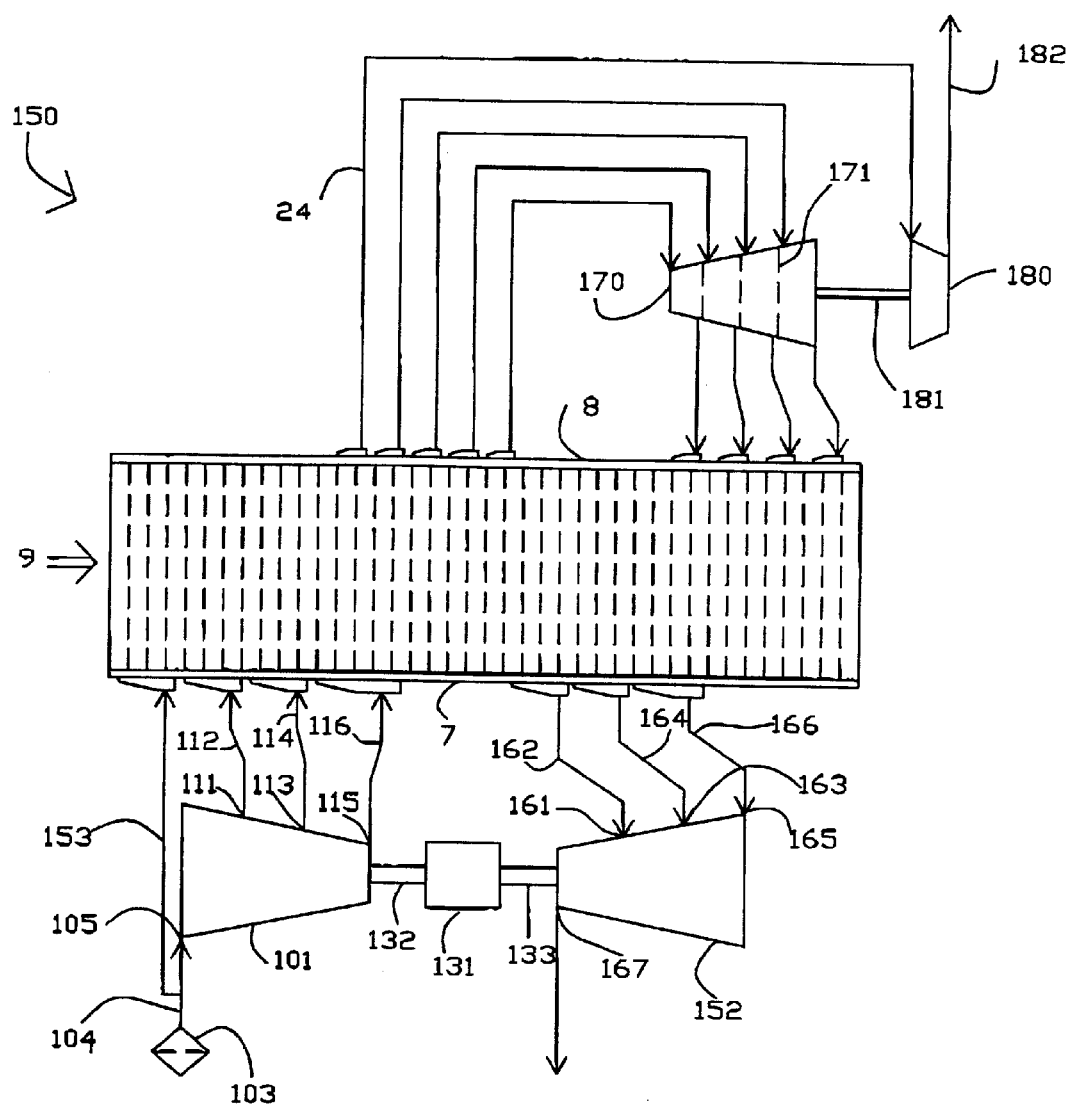
FIG. 4 shows a simplified schematic of a gas separation apparatus for oxygen production, using a split stream air compressor, a split stream vacuum pump, and a split stream light reflux expander powering a product oxygen compressor.

FIG. 4 shows a simplified schematic of a PSA air separation system 150, with a split stream centrifugal compressor 101 as in FIG. 3, and a split stream countercurrent blowdown vacuum pump 152 powered by motor 131 by shafts 132 and 133 respectively.

Branching from infeed conduit 104 is first feed pressurization conduit 153, which defines a first intermediate feed pressurization pressure substantially equal to ambient. Hence the first diffuser discharge port 111 of feed compressor 101 operates at the second intermediate feed pressurization pressure, second diffuser discharge port 113 operates at a third intermediate feed pressurization pressure, and third diffuser discharge port 115 operates at the higher pressure of the cycle as before.

Split stream vacuum pump 152 receives the countercurrent blowdown and exhaust flow in three streams entering three inlet ports, a first inlet port 161 receiving exhaust gas at a first countercurrent blowdown intermediate pressure from countercurrent blowdown conduit 162, a second inlet port 163 receiving exhaust gas at a second countercurrent blowdown intermediate pressure from countercurrent blowdown conduit 164, and a third inlet port 165 receiving exhaust gas at the lower pressure of the cycle from exhaust conduit 166. The combined exhaust gas is discharged as second product gas from outlet diffuser port 167 of the vacuum pump 152 into discharge conduit 168.

A split stream light reflux expander 170 is provided to provide pressure let-down of the illustrated four light reflux stages with energy recovery. As indicated by dashed lines 171, the stages may be compartmentalized within the light reflux expander to minimize mixing of gas concentration between the stages. The light product purity will tend to decline from the light reflux stages of higher pressure to those of lower pressure, so that a desirable stratification of the light reflux can be maintained if mixing is avoided. However, in most air separation applications, purity of the light product oxygen is not critical, since the presence of argon concentrated with the oxygen will limit oxygen purity to about 95%. Hence, compartmentalization of the split stream light reflux expander is not mandatory for oxygen PSA or VSA systems.

Unlike the prior examples of the split stream compressor (one feed is split into several compressed streams at different total pressures) or the split stream exhauster (expander or vacuum pump, with three inlet streams at different total pressures combined into a single discharge stream), the split stream light reflux expander has several separate streams entering at different total pressures, with those same streams discharged again at different total pressures after pressure let-down in the expander.

Light reflux expander 170 is coupled to light product pressure booster compressor 180 by drive shaft 181. Compressor 180 receives the light product from conduit 24, and delivers light product (compressed to a delivery pressure above the higher pressure of the PSA cycle) from delivery conduit 182. Since the light reflux and light product are both enriched oxygen streams of approximately the same purity, expander 170 and light product compressor 180 maybe hermetically enclosed in a single housing. This configuration of a "turbocompressor" oxygen booster without a separate drive motor is advantageous, as a useful pressure boost of the product oxygen can be achieved without an external motor and corresponding shaft seals.

FIG. 5

Figure 5:
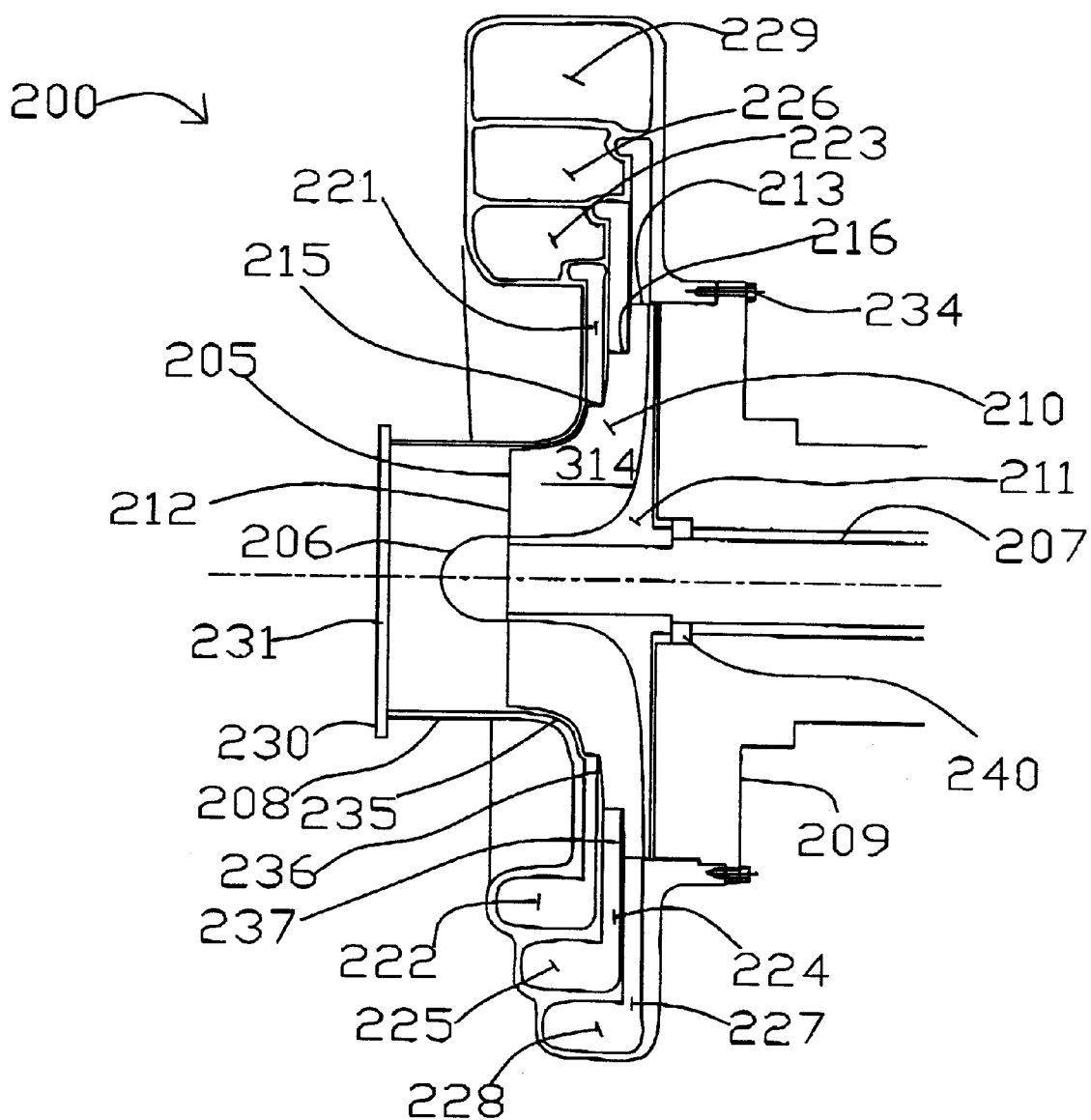
FIG. 5 shows a split stream centrifugal compressor according to a first embodiment of the invention, incorporating a cutback impeller, and discrete delivery radii for each stepped section of the impeller.

The first embodiment of the invention will now be described with reference to FIG. 5. FIG. 5 is a transverse view of split stream centrifugal compressor 200. The compressor 200 has a single inlet, but the flow is split to discharge from the single impeller into three separate diffusers and volutes which deliver three compressed gas flows at different total pressures or enthalpies to the PSA apparatus.

Figure 9:
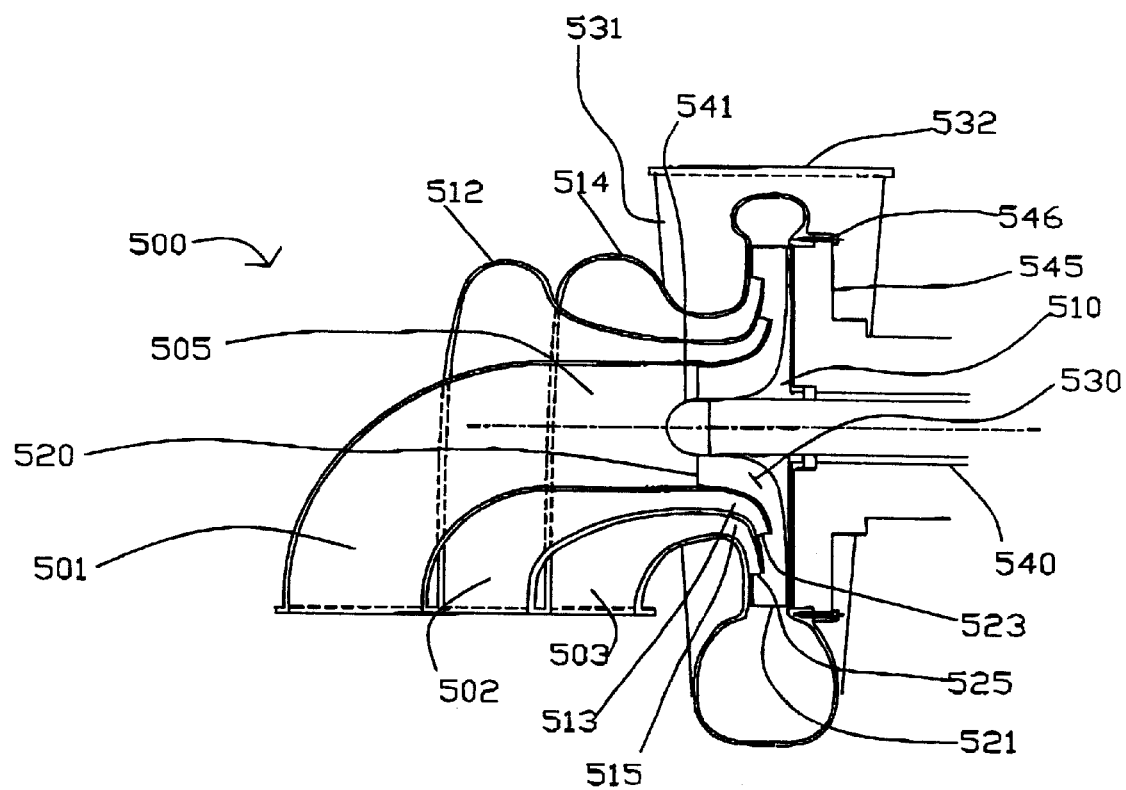
FIG. 9 shows a variation of the split stream centrifugal vacuum pump shown in FIG. 8, with a stepped impeller and discrete delivery radii for each stepped section of the impeller.

Compressor 200 has a bladed impeller 205 fixed by hub bolt 206 to shaft 207. The impeller 205 is mounted between casing 208 and housing 209. Impeller 205 is a semi-open impeller, with a plurality of blades 210 at preferably equal angular spacing and fixed to the hub 211. The blades 210 extend from impeller eye 212 to impeller tip 213, and may be radial or inclined rearwards (as shown in FIG. 9). Impeller channels 214 are defined between each adjacent pair of blades 210, hub 211 and casing 208. The impeller blades 210 are cut back at steps 215 and 216, at which the channels 214 are narrowed so as to direct a portion of the flow in each channel 214 out of the impeller 205 at each step 215 and 216. It will be evident that the energy or enthalpy of the flows leaving the impeller 205 from step 215, step 216 and tip 213 will be successively increased as increased angular momentum flow is obtained at greater radius within the impeller channels 214.

Casing 208 has an inlet flange 230 and inlet 231. Inlet guide vanes may also be provided. The diffusers and collector scrolls are also formed within casing 208. Casing 208 and housing 209 are mutually attached by bolts 234.

The impeller blades 210 are sealed to minimize leakage on their front edges by narrow clearances or labyrinth seals 235, 236 and 237 respectively between the inlet and the first step, between the first and second steps, and between the second step and the tip. A shaft seal 240 is provided between shaft 207 and housing 209.

In operation, fluid flow enters the impeller channels 214 through the inlet 231 and is discharged from the impeller 205 via the steps 215,216 and the tip 213. The flow discharging from the impeller 205 from step 215 enters first diffuser 221 for recovery of pressure head from velocity head, and is then delivered from first collector scroll 222 to first discharge conduit 223 at a first intermediate pressure. The flow discharging from the impeller 205 from step 216 enters second diffuser 224 for recovery of pressure head from velocity head, and is then delivered from second collector scroll 225 to second discharge conduit 226 at a second intermediate pressure. The flow discharging from the impeller from tip 213 enters third diffuser 227 for recovery of pressure head from velocity head, and is then delivered from third collector scroll 228 to third discharge conduit 229 at the final delivery pressure. Diffusers 221, 224 and 227 may each be conventional vaned, vaneless or volute diffusers. At each cutback step 215 and 216, the meridional height of channel 214 is reduced by the width of the step, reflecting the diversion of outward flowing fluid into diffusers 221 and 224.

It will be evident that more cutback steps could be provided with more diffusers and volutes to achieve more intermediate pressure flows, or a single cutback step might have been provided with only two diffusers and volute pairs to achieve two delivery flows at the final pressure and one intermediate pressure less than the final pressure.

Figure 6:
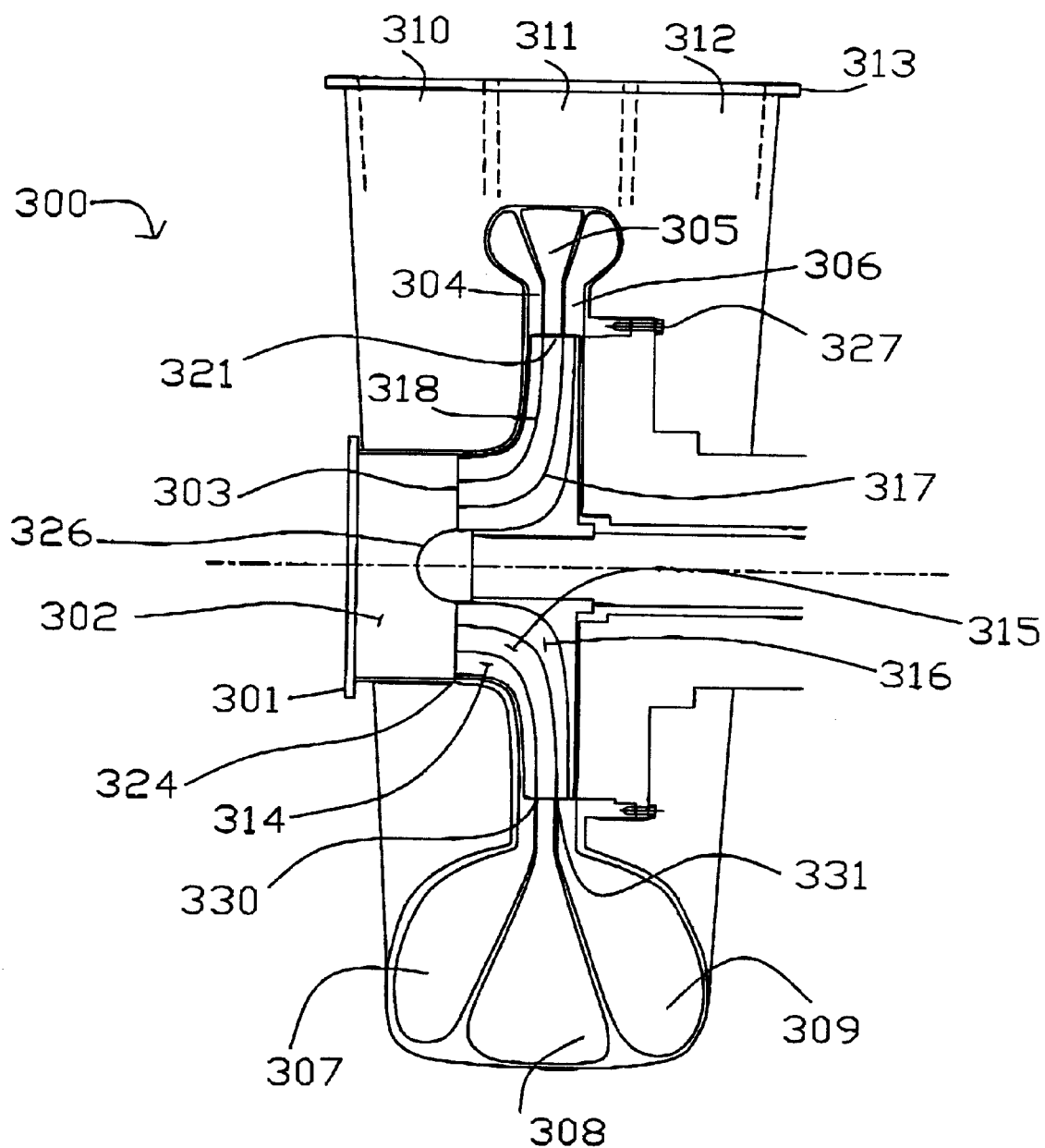
FIGS. 6 and 7 show a variation of the split stream centrifugal compressor shown in FIG. 5, incorporating a compartmentalized impeller with variable impeller blade angle across the blade height, with the impeller sections in each of three compartments having different blade angles.
Figure 7:
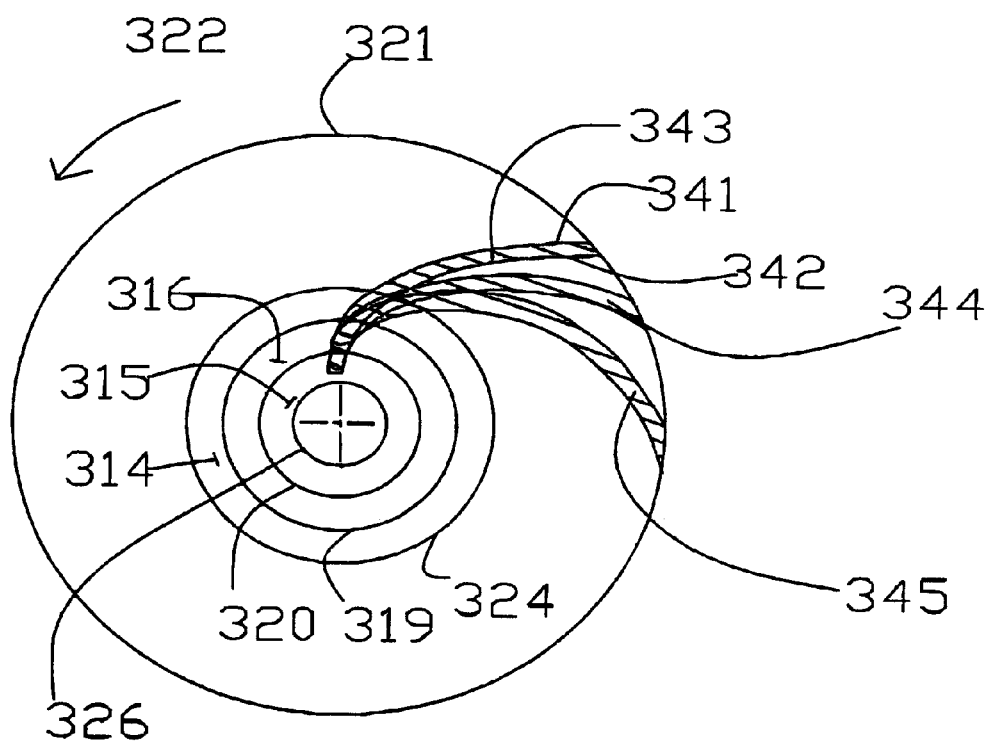

FIGS. 6 and 7

Whereas a split stream compressor (with a single inlet and three discharge flows at different pressures) was achieved in embodiment 200 by discharging the split flows from the impeller at sequentially increasing radius into separate diffusers, it is also possible to achieve such a compressor by discharging the split flows from the impeller at substantially the same radius but with sequentially steeper blade angles. The impeller is compartmentalized over most of the radial extent of the channels between the impeller blades, so that the flow does not spill between channels having differing blade angle and curvature. However, in one variation, some or even all of the radial extent of the channels is not compartmentalized. In uncompartmentalized sections, preferably the blades are twisted to maintain the axially changing blade angle.

FIG. 6 shows the meridional view of split stream compressor embodiment 300. The gas flow passes through the inlet flange 301; inlet 302; impeller 303; three diffuser channels 304, 305 and 306; three collector scrolls 307,308 and 309; and three outlets 310,311 and 312 in outlet flange 313. Within the impeller 303 there are three compartments 314, 315 and 316. Compartments 314 and 315 are separated by partition 318, while compartments 315 and 316 are separated by partition 317. Where any portion of partitions 317 and 318 may be deleted, lines 317 and 318 then represent fluid streamlines in the impeller. Partitions 317 and 318 respectively have leading edges 319 and 320 at the inlet and terminate at impeller outer radius 321. The direction of rotation of the impeller 303 is indicated by arrow 322 in FIG. 7.

The impeller return path is sealed using labyrinth seals 324. The impeller is connected to the shaft 325 using a hub bolt connection 326. The entire volute is connected to the main housing at the housing connection points 327. Diffuser channels 304 and 305 are separated by diffuser partition 330 which has a narrow sealing clearance to impeller partition 318 at radius 321, and diffuser channels 305 and 306 are separated by diffuser partition 331 which has a narrow sealing clearance to impeller partition 317.

As the flow passes through the impeller 303, the flow experiences changing blade twist over the blade height, or different blade angle in the separate compartments. In the inlet view of FIG. 7, the blade pressure side 341 and suction side 342 of a single blade are shown for three cut sections of typical blades at the approximate centreline of each compartment. The three blades sectioned are (1) blade 343 in hub side compartment 316, (2) blade 344 in central compartment 315, and (3) blade 345 in casing side compartment 314. The number of blades in each compartment may be similar to conventional centrifugal machines, e.g. about seventeen blades. The blade angle is steeper at the hub, so that a higher total pressure rise is achieved in compartment 316 than on compartment 315, and in compartment 315 than in compartment 314. Alternately, the blade angle may be steepest adjacent the casing. In either case, the three exit steams are held separate and exit to differing enthalpy requirements.

In the split stream compressor 300, the outlet flow is radially outward. The direction of rotation and of flow may be reversed to operate as an expander, suitable for energy recovery from expansion of countercurrent-blowdown gas, with the combined flow exiting at a single total pressure by outlet 303 and outlet flange 302. It will be evident that the compressor 200 could similarly be operated in reverse as a split stream expander.

FIG. 8

Figure 8:
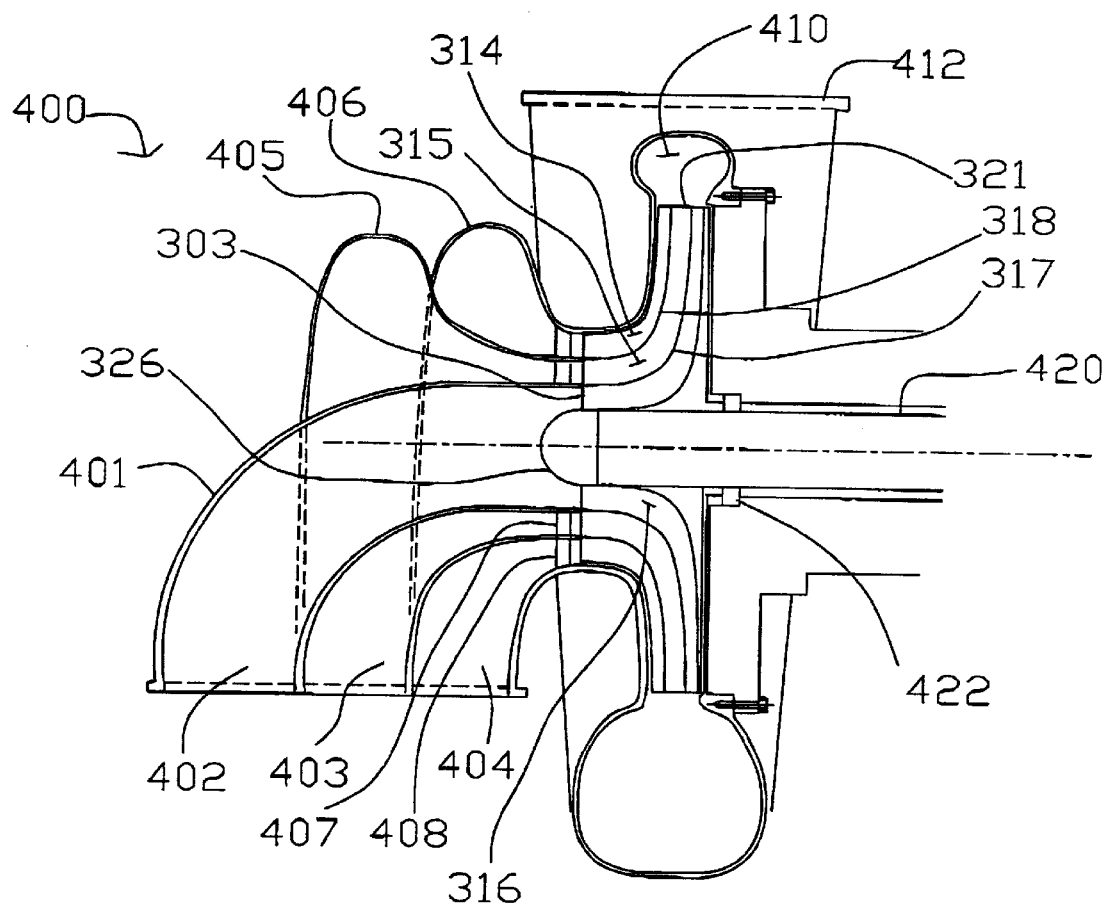
FIG. 8 shows a split stream centrifugal vacuum pump, according to a second embodiment of the invention, incorporating a compartmentalized impeller and with the impeller sections in each of three compartments having different blade angles.

Shown in FIG. 8 is a split stream exhauster or vacuum pump 400 having three compartmentalized inlet eyes. The exhauster meridional view shows the flow entering an inlet volute assembly 401 having a first inlet 402 at the lowest pressure, a second inlet 403 at an intermediate pressure, and a third inlet 404 at a higher pressure still below ambient pressure. Second inlet 403 and third inlet 404 admit their respective streams to volutes 405 and 406, to convert a portion of inlet static pressure to swirl velocity. Preferably the second inlet 403 and third inlet 404 have guide vanes 407, 408 or nozzles, not shown, for assisting in converting a portion of inlet static pressure to swirl velocity. A compartmentalized impeller with variable blade angle similar to impeller 303 of FIGS. 6 and 7 is used in embodiment 400, and is depicted in FIG. 8 with the same reference numerals. Inlet 402 communicates to compartment 316, inlet 403 communicates to compartment 315, and inlet 404 communicates to compartment 314. The discharge flow from the three compartments exits the impeller at outer radius 321 and is combined in a single volute 410 leading to discharge 412 at substantially atmospheric pressure.

Impeller 303 is driven by shaft 420 through shaft seal 422. As the flow passes through the impeller 303, energy is added to each stream entering the impeller eye. However because the blade angle is steeper along the hub side than the shroud side, greater energy will be transferred from the impeller to the hub side stream, than the shroud side.

FIG. 9

Shown in FIG. 9 is the split stream exhauster or vacuum pump 500 having three inlet scrolls at three radii. In the meridional view the flows, at successively higher inlet total pressures below ambient pressure, pass respectively through first inlet 501, second inlet 502 or third inlet 503. First inlet 501 leads to the eye inlet 505 of impeller 510. Second inlet 502 leads by inlet scroll 512 to nozzle 513. Third inlet 503 leads by inlet scroll 514 to nozzle 515. Nozzles 513 and 514 are swirl means to impart swirl angular velocity to the flows entering the impeller. Impeller 510 has an eye inlet 520 and an outer radius exit 521, and is cut out with intermediate steps 523 and 525 at which the depth of impeller channels 530 successively increases with radius to receive additional flow from nozzle 513 at step 523 and from nozzle 515 at step 525. The combined discharge exits impeller 510 at outer radius 521, and enters volute diffuser channel 530 in volute 531 leading to discharge flange 532 at substantially ambient pressure. The impeller 501 is connected to the shaft 540 using a hub bolt connection 541. The entire volute 531 is connected to the main housing 545 at the housing connection points 546.

As the flow passes through the impeller 510, energy is added to each stream entering the impeller 510. Preferably, nozzles or equivalent nozzle guide vanes are included to accelerate the streams entering the impeller 510 at greater radii. In this manner the fluid entering from outer radius sections will receive less energy transferred, since it has shorter flow path inside the impeller passage than fluid entering at smaller radius portions.

FIG. 10

Figure 10:
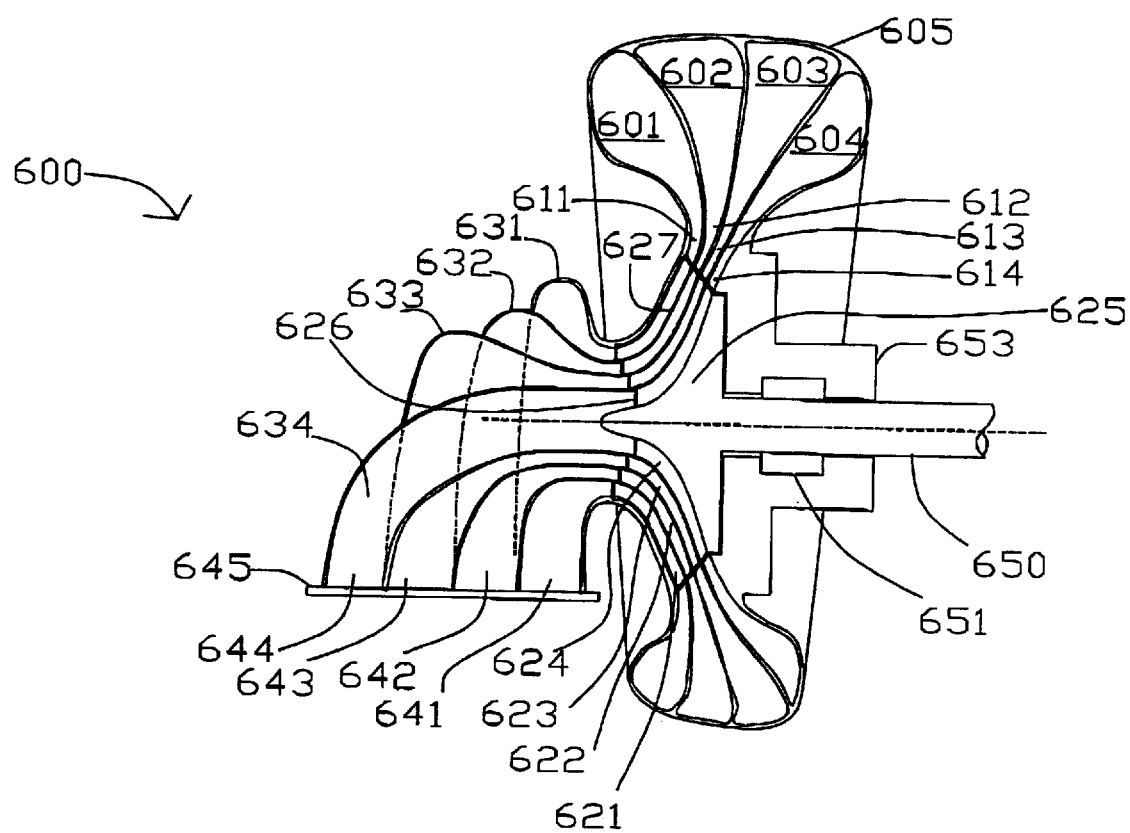
FIG. 10 shows a split stream light reflux expander with a compartmentalized impeller, according to a third embodiment of the invention.

Shown in FIG. 10 is the split stream expander 170 having four compartmentalized inlet scrolls, a compartmentalized impeller, and compartmentalized outlet diffusers. Four streams of light reflux gas (enriched oxygen in an air separation application) at four stepwise different inlet total pressures are subjected to pressure let-down to four stepwise different exit total pressures. It is desirable (although not mandatory) that distinctness of the four light reflux streams be maintained, since they are ordered as to degree of purity. This stratification of the light reflux is desirable to maintain sharpness of concentration gradients, so that the highest purity of the light product can be achieved with high productivity and yield or fractional recovery.

The illustrated number of four light reflux streams is arbitrary. With a greater number of light reflux streams drawn over narrower time intervals and from closely spaced pressure intervals, process performance and energy efficiency can theoretically be enhanced. However, a greater number of light reflux streams would make the split stream expander 170 more complex, and with an efficiency loss due to the greater wetted surface area and boundary layer friction of additional compartments. A smaller number of light reflux streams would reduce process performance and efficiency, but would simplify the split stream expander while reducing the wetted surface area of its high velocity flow passages.

In the split stream expander 170, the four inlet streams enter four inlet scrolls 601, 602, 603 and 604 in inlet scroll assembly 605, each stream having a different enthalpy level or total pressure. The highest pressure light reflux stream, at substantially the higher pressure 11 of the PSA cycle shown in FIG. 2, enters the first inlet scroll 601. Sequentially lower pressure light reflux streams enter second inlet scroll 602 at substantially pressure 32, third inlet scroll 603 at substantially pressure 36, and fourth inlet scroll 604 at substantially pressure 40.

From the inlet scrolls the streams flow through four nozzles 611, 612, 613, and 614 into four bladed impeller compartments 621, 622, 623 and 624 of impeller 625. Impeller 625 is radially stepped at both inlet and exit. As shown in FIG. 10, the compartments are radially staggered, so that compartment 621 passing the stream of highest pressure is positioned radially outward, while compartment 624 passing the stream of lowest pressure is positioned radially inward. Compartment 624 terminates at impeller eye 626. The depicted radial staggering of the compartments will minimize pressure differences and consequent leakage between compartments at the inner and outer radii of the partitions (e.g. 627) between them. Blade angles within the compartments may be identical to simplify structural design and stress analysis of the impeller, or may be different to achieve a further effect in differentiating the enthalpy or total pressure changes between the streams.

If the blade geometry in each compartment is identical, partitions 627 can be deleted from impeller 625, so that lines 627 indicate nominal streamline boundaries between the light reflux streams. In this variation, the compartments are no longer separated by physical barriers to mixing, and simply become "zones" for their respective streams. Without partitions between compartments, the impeller is structurally much simpler, and skin friction losses in impeller passages are reduced. However significant mixing between the light reflux streams is expected.

The four streams flow radially inward though the impeller compartments or zones, losing angular momentum and enthalpy, while exerting torque on the blades with the compartments of impeller 625. Exiting the impeller compartments at their respective inner radii, three of the streams flow from compartments 621, 622 and 623 respectively into outlet diffuser scrolls 631, 632 and 633, while the lowest pressure stream flows from compartment 624 past impeller eye 626 into outlet diffuser conduit 634. The four light reflux streams are discharged from outlets 641, 642, 643 and 644 of outlet flange 645 at stepped total pressures 64, 62, 60 and 12 of the PSA cycle shown in FIG. 2.

Impeller 625 has shaft 650, in turn supported on bearing 651 in housing 652. As the flow passes through the impeller of the split stream expander, energy is extracted from each stream to the shaft. As suggested in PSA process embodiment 150 of FIG. 4, this shaft may be used to drive a light product (e.g. oxygen) compressor to boost the pressure of the light product above the higher pressure of the PSA process. Since the light reflux and light product are almost identical in composition, a common housing may be used to enclose the light reflux expander 170 and the light product compressor 180, as in typical turbocharger devices.

FIG. 11

Figure 11:
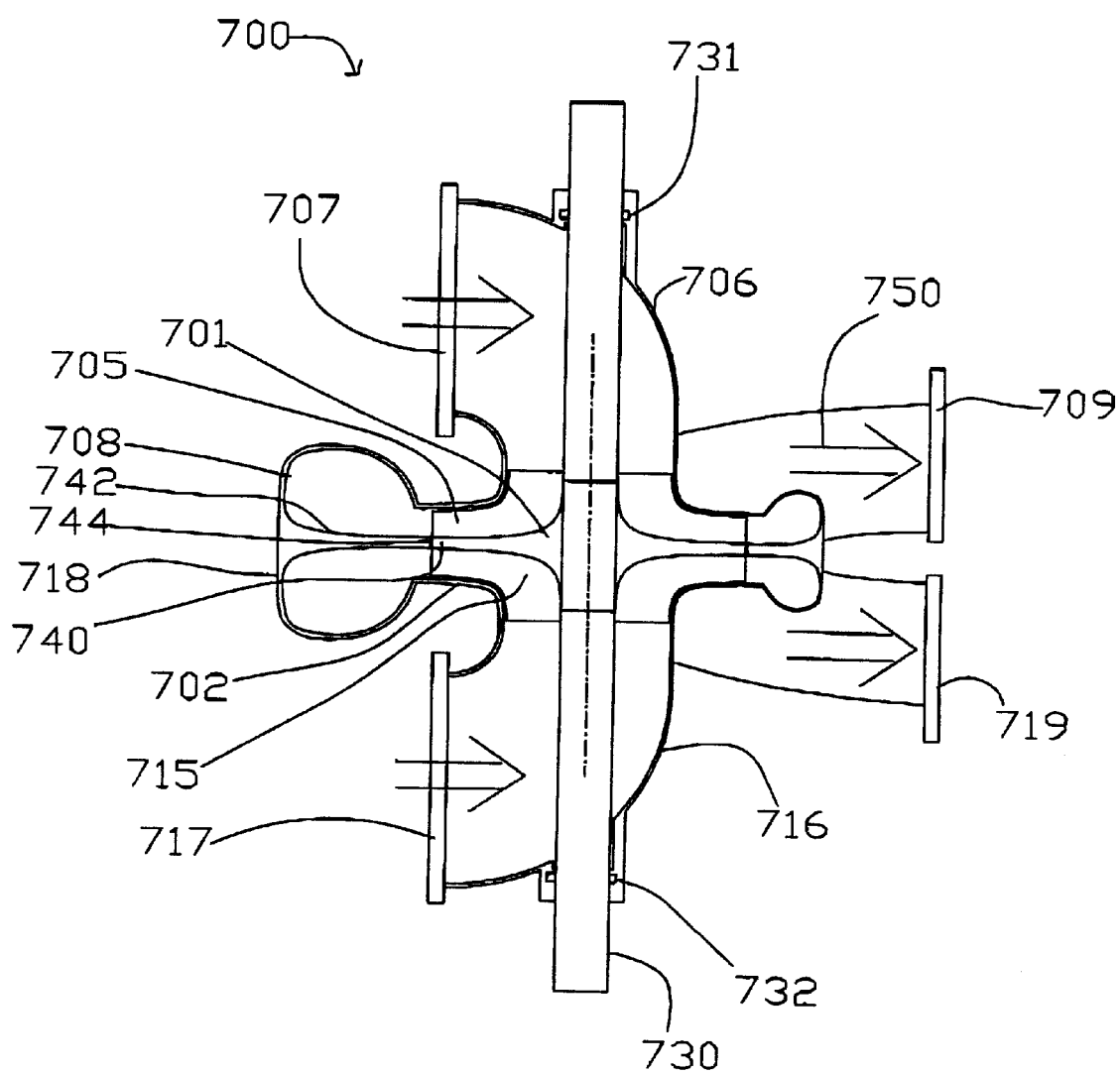
FIG. 11 is a meridional view of a split stream or multi-enthalpy machine, according to the invention, incorporating a double sided impeller for different enthalpy level streams.

FIG. 11 shows a versatile split stream machine with a double sided impeller. This machine may be used as a split stream compressor, vacuum pump, or expander. The double sided impeller immediately provides for two split streams. It will be evident that either side of the impeller may be stepped to further split impeller streams according to impeller radius transited (as in FIGS. 5 and 9). Alternatively, either side of the impeller may be compartmentalized to further split impeller streams according to blade angle (as in FIGS. 6, 7 and 8). Further, one side of the impeller may be stepped, while the other side is compartmentalized.

Split stream machine 700 has a double sided impeller 701 within casing 702. Impeller 701 has a first impeller side 705 co-operating with first inlet volute 706 receiving a first gas stream from inlet 707, and with first discharge diffuser volute 708 delivering the first gas stream to discharge 709; and a second impeller side 715 co-operating with second inlet volute 716 receiving a second gas stream from inlet 717, and with second discharge diffuser volute 718 delivering the second gas stream to discharge 719. Preferably, the first and second impeller sides 705, 715 have different in geometries e.g. by having differing blade angles, to achieve different changes of enthalpy for the two streams.

The double sided impeller 701 is supported on shaft 730, here shown with bearing and sealing assemblies 731 and 732 respectively penetrating the first and second inlet volutes 706, 716. The impeller 701 has a disc partition 740 between its first side flow channel 705 and its second side flow channel 715. The first discharge volute 708 is separated from second discharge volute 718 by a diaphragm partition 742. A labyrinth or clearance seal 744 is provided between partitions 740 and 742 to minimize leakage between the two streams.

As discussed above, the split stream machine 700 may be used as a compressor, a vacuum pump or an expander. When used as a split stream compressor or vacuum pump, the direction of flow is as indicated by arrow 750. A split stream compressor based on split stream machine 700 connects inlets 707 and 717 in parallel to receive feed gas at the same inlet pressure, while delivering the discharge streams at different total pressures from discharges 709 and 719. A split stream vacuum pump or exhauster based on split stream machine 700 maintains separate inlets 707 and 717 to receive inlet exhaust gas at differing total pressures, while delivering the discharge streams at the same total pressures from discharges 709 and 719 now connected in parallel.

When used as a split stream expander, the direction of flow is reversed from that indicated by arrow 750. Terminology is also changed, so that impeller first side 705 receives flow from inlet 709 into nozzle volute 708, and discharges flow to diffuser 706 and discharge 707; while impeller second side 715 receives flow from inlet 719 into nozzle volute 718, and discharges flow to diffuser 716 and discharge 717. For a two stream light reflux expander, inlets 709 and 719 remain distinct, and likewise discharges 707 and 717 remain distinct. For a countercurrent blowdown expander (e.g. 102 of FIG. 3), inlets 709 and 719 remain distinct to receive streams of differing total pressure or enthalpy, while discharges 707 and 717 are connected in parallel to discharge a combined flow at typically ambient pressure.

It will be evident that either or both sides of the double sided split stream machine 700 may be further compartmentalized to provide additional split streams, according to any of the above embodiments illustrated in FIGS. 5–10.

FIG. 12

Figure 12:
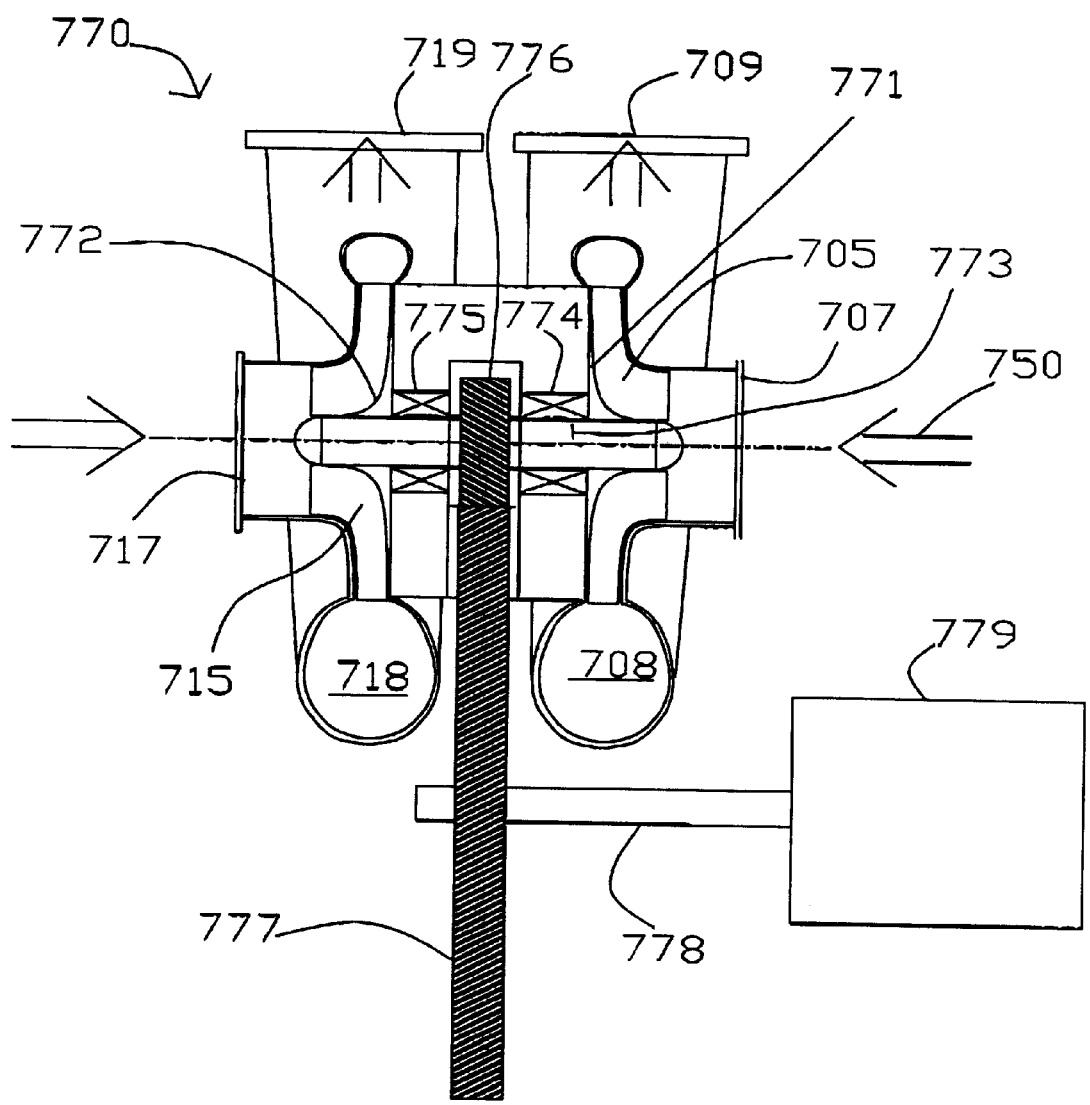
FIG. 12 is a meridional view of a split stream or multi-enthalpy machine, according to the invention, incorporating twin impellers for different enthalpy level streams.

FIG. 12 shows a split stream machine 770 similar to split stream machine 700. Split stream machine 770 includes a twin impeller having a first impeller 771 supporting the first impeller side 705, and a second impeller 772 supporting the second impeller side 715. First and second impellers 771 and 772 are mounted on a common shaft 773, with bearing and fluid seal assemblies 774 and 775 for each impeller. Between the bearing and fluid seal assemblies 774, 775, shaft 773 has a drive pinion 776 engaging bull gear 777 on shaft 778, in turn driven by motor 779.

The split stream machine 770 may be applied to the PSA system embodiment 100 of FIG. 3. Thus, the first impeller 771 (with cooperating inlet and diffuser discharge components) may be replaced by a split stream feed compressor (e.g. FIG. 5 or 6) equivalent to compressor 101, while second impeller 772 (with cooperating inlet and diffuser discharge components) may be replaced by a split stream countercurrent blowdown expander (e.g. FIG. 5 or 6) equivalent to expander 102.

Likewise the split stream machine 770 may be applied to the PSA system embodiment 150 of FIG. 4. Again, the first impeller 771 (with cooperating inlet and diffuser discharge components) would be replaced by a split stream feed compressor (e.g. FIG. 5 or 6) equivalent to compressor 101, while second impeller 772 (with cooperating inlet and diffuser discharge components) may be replaced by a split stream vacuum pump (e.g. FIG. 8 or 9) equivalent to exhauster 152.

FIG. 13

Figure 13:
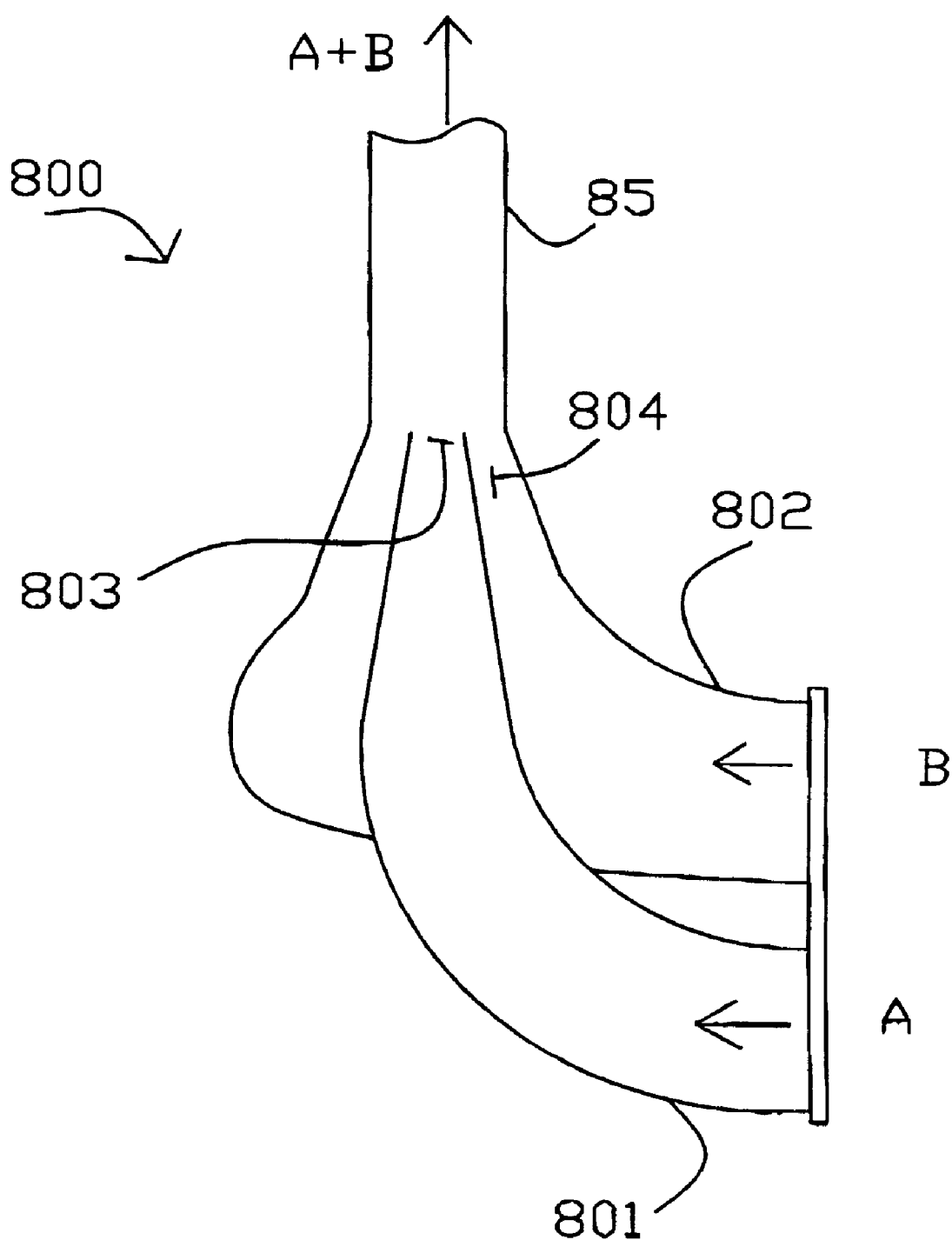
FIGS. 13 and 14 show ejectors for combining countercurrent blowdown streams at different streams into inlet nozzles of an expander or inlet nozzles of the split stream vacuum pump.

FIG. 13 shows an ejector 800 for combining a pair of countercurrent blowdown streams into a single stream prior to entering an inlet nozzle of an expander or an inlet nozzle of a split stream vacuum pump. This embodiment allows up to twice the number of countercurrent streams to exit the first valve means, relative to the number of such streams entering inlet nozzles of the expander or vacuum pump stages. It is desirable to provide the total countercurrent flow at the first valve means as a relatively large number of separate streams at more closely spaced intermediate countercurrent blowdown pressures, so as to reduce the pressure intervals over which irreversible expansion takes place in the first valve means and associated restrictor orifices. Any stream entering the expander or vacuum pump may thus be a combination of two countercurrent blowdown streams leaving the first valve means. For example, the apparatus of FIG. 13 could be used in the apparatus shown in FIG. 3 to combine streams through conduits 122 and 124 prior to entry into expander 102.

Ejector 800 has a first inlet 801 to which a first stream "A" of countercurrent blowdown gas is admitted from the second valve means at a first total pressure, and a second inlet 802 to which a second stream "B" of countercurrent blowdown gas is admitted from the second valve means at a second total pressure lower than the first pressure. The first flow is conveyed from inlet 801 to first nozzle 803, while the second stream is conveyed from the second inlet to a second nozzle 804, here depicted as an annulus around first nozzle 801. The area of nozzle 801 is relatively small, so as to achieve a high velocity of the first stream from nozzle 803. The area of nozzle 804 is relatively large, so that the velocity of the second stream from nozzle 804 is relatively low.

Nozzles 803 and 804 deliver the first and second streams into a mixing section 85, in which the streams mix into a combined stream "A+B" at a third total pressure intermediate between the first and second pressures. If the mass flows of the first and second streams are similar, the third total pressure may be approximately equal to the first total pressure plus ¼ the difference between the first and second total pressures.

In a conventional ejector, the combined stream would normally enter a diffuser after mixing section 85. Here, the combined stream will be kept at the relatively high velocity after mixing, for admission to an expansion turbine or an intermediate inlet of a split stream vacuum pump. This ejector is accordingly a mixing nozzle.

FIG. 14

Figure 14:
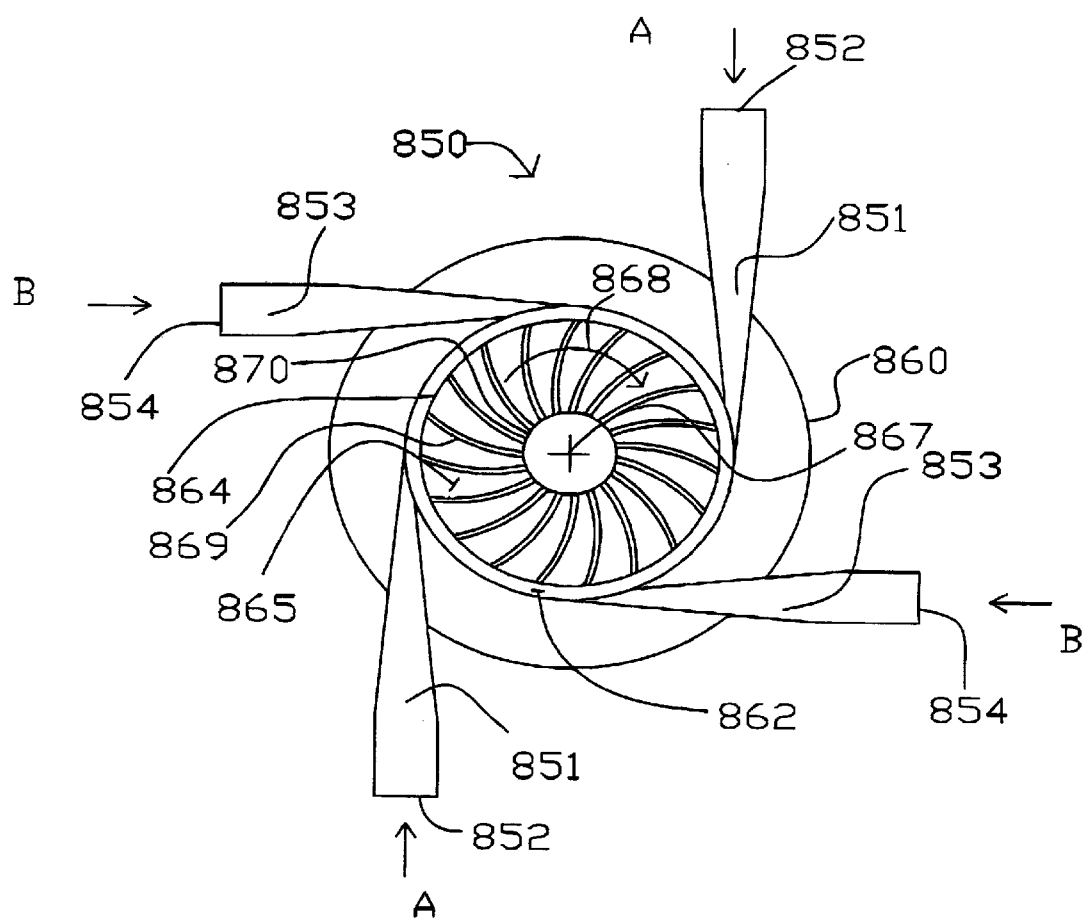

FIG. 14 shows a nozzle assembly 850 with multiple ejectors for combining countercurrent blowdown streams at different streams into inlet nozzles of an expander or inlet nozzles of a split stream vacuum pump.

Nozzle assembly 850 has an impeller 865 which may comprise (but is not limited to) the impeller 205 shown in FIG. 5, the impeller 303 shown in FIG. 6, the impeller 510 shown in FIG. 9 and the impeller 625 shown in FIG. 10. The nozzle assembly has a number "N" (here N=2) first nozzles 851 with inlets 852 to which first stream "A" is admitted in parallel, and also an equal number of "N" second nozzles 853 with inlets 854 to which second stream "B" is admitted in parallel. Preferably, the first and second nozzles 851, 853 are equally spaced about nozzle ring 860. The first and second nozzles 851, 853 deliver their streams tangentially into annular nozzle chamber 862 defined between nozzle ring 860 and impeller inlet radius 864 at which the combined stream "A+B" will enter impeller 865. The impeller 865 rotates about axis 867 as indicated by arrow 868. As in ejector 800, nozzle areas are selected so that the first stream enters the nozzle chamber 862 at a significantly higher velocity than the second stream. Nozzle chamber 862 will serve as a mixing chamber, in which the combined stream is mixed to approach a combined velocity and a third intermediate total pressure, as in ejector 800. Further mixing may take place within the impeller itself.

It is seen that ejector 850 is really a mixing nozzle, so that two streams at different inlet total pressures may be combined into a single stream in the turbomachinery. This is a relatively inexpensive way to increase the number of split streams in the PSA process, while having a smaller number of streams in the turbomachinery.

FIG. 15

Figure 15:
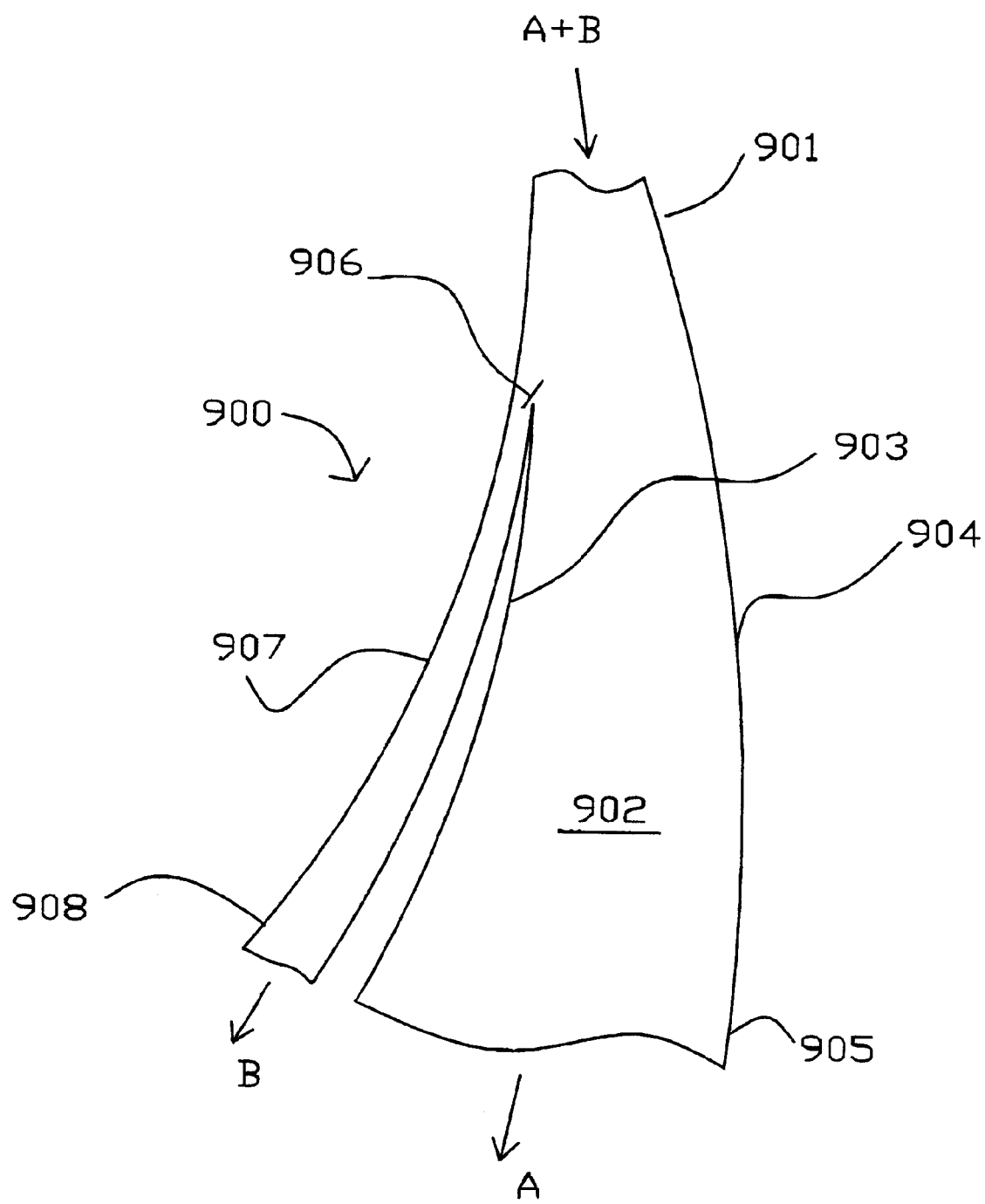
FIG. 15 shows a diffuser for the split stream compressor, with a slot to divert a lower pressure stream.

FIG. 15 shows a diffuser 900 for a compressor, with a slot to divert a lower pressure stream. Diffuser 900 has an inlet 901, and a main channel 902 with a first wall 903, a second wall 904, and an exit 905. Walls 903 and 904 are divergent from inlet 901 to exit 905, so as to achieve recovery of static pressure from the high velocity inlet stream entering inlet 901 from a compressor impeller.

A primary stream "A" is delivered from exit 905. A slot 906 is provided in the first wall 903 to divert boundary layer fluid from the main channel 902 into a side channel 907. Slot 906 may equivalently be provided as a plurality of small apertures or pores in wall 903. The flow in channel 907 is a secondary stream "B", which is delivered from exit 908. Hence, the flow from the compressor impeller into inlet 901 is a combined flow "A+B".

Diffusers are typically an inefficient component of centrifugal compressors, owing to the unfavourable expansion which tends to cause stall as boundary layers thicken and begin to recirculate. This is particularly true if the diffuser wall is convex toward the flow, as here illustrated for first wall 903. It is well known that suction from the wall of diffusers can improve efficiency, by removing the "tired" boundary layer. However, suction requires a sink to which the secondary flow "B" can be delivered at a lower total pressure than the final delivered total pressure of the primary flow "A".

Because the diffuser 900 delivers multiple split streams from the feed compressor to the first valve means, primary stream "A" will be a feed stream admitted to the first valve means at a particular feed pressure, and secondary stream "B" will be a feed stream admitted to the first valve means at an intermediate pressure lower than the said feed pressure. Alternatively, stream "B" could be injected into a second diffuser of a split stream compressor, with the second diffuser working at an inlet enthalpy or total pressure less than the enthalpy or total pressure of stream "A" in diffuser 950.

The foregoing description is intended to be illustrative of the present invention. Those of ordinary skill will be able to envisage certain additions, deletions or modifications to the described embodiments which do not depart from the spirit or scope of the invention as defined by the appended claims.

We claim:

1. A gas separation system for separating a feed gas mixture comprising a first gas component and a second gas component, the gas separation system comprising:
   a stator, including a first stator valve surface, a second stator valve surface; and a plurality of function compartments opening into the stator valve surfaces;
   a rotor rotatably coupled to the stator, and including a first rotor valve surface in communication with the first stator valve surface, a second rotor valve surface in communication with the second stator valve surface, and a plurality of rotor flow paths for receiving adsorbent material therein for preferentially adsorbing the first gas component in response to increasing pressure in the rotor flow paths in comparison to the second gas component, each said rotor flow path including a pair of opposite ends opening into the rotor valve surfaces for communication with the function compartments; and
   centrifugal turbomachinery coupled to a portion of the function compartments, and including an impeller having a plurality of impeller flow paths for exposing each said rotor flow path to a plurality of different pressures between an upper pressure and a lower pressure as the rotor rotates for separating the first gas component from the second gas component.

2. The gas separation system according to claim 1, wherein each said impeller flow path communicates with a respective one of the function compartments for maintaining each said function compartments at one of the plurality of pressures.

3. The gas separation system according to claim 1, wherein the centrifugal turbomachinery comprises a split stream centrifugal compressor for delivering the feed gas mixture to the first stator valve surface at a plurality of different feed gas pressure levels.

4. The gas separation system according to claim 1, wherein the centrifugal turbomachinery comprises a split stream centrifugal expander for exhausting gas flows enriched in the first gas component received from the first stator valve surface at a plurality of different exhaust gas pressure levels as a first product gas.

5. The gas separation system according to claim 3, wherein the centrifugal turbomachinery comprises a split stream centrifugal expander coupled to the centrifugal compressor for exhausting gas enriched in the first gas component received at a plurality of different exhaust gas pressure levels from the first stator valve surface as a first product gas and for assisting the centrifugal compressor in delivering the feed gas mixture to the first stator valve surface.

6. The gas separation system according to claim 1, wherein the centrifugal turbomachinery comprises a split stream centrifugal expander for extracting gas enriched in the first gas component received from the first stator valve surface at a plurality of different exhaust gas pressure levels as a first product gas.

7. The gas separation system according to claim 3, wherein the centrifugal turbomachinery comprises a split stream centrifugal vacuum pump coupled to the centrifugal compressor for extracting gas enriched in the first gas component received from the first stator valve surface at a plurality of different exhaust gas pressure levels as a first product gas and for assisting the centrifugal compressor in delivering the feed gas mixture to the first stator valve surface.

8. The gas separation system according to claim 1, wherein the gas separation system includes a light reflux expander for receiving gas enriched in the second gas component from the second stator valve surface at a plurality of different reflux exit gas pressure levels, for performing pressure let-down of the received gas, and for returning the pressure-reduced received gas as light reflux return gas to the second stator valve surface to enhance purity of gas extracted from the second stator valve surface enriched in the second gas component as a second product gas.

9. The gas separation system according to claim 8, wherein the gas separation system includes a compressor coupled to the light reflux expander for increasing a pressure of the gas extracted as the second product gas.

10. The gas separation system according to claim 1, wherein the gas separation system includes at least one throttle valve for receiving gas enriched in the second gas component from the second stator valve surface at a plurality of different reflux exit gas pressure levels, for performing pressure let-down of the received gas, and for returning the pressure-reduced received gas as light reflux return gas to the second stator valve surface to enhance purity of gas extracted from the second stator valve surface enriched in the second gas component as a second product gas.

11. The gas separation system according to claim 3, wherein the split stream centrifugal compressor comprises a gas inlet for receiving the feed gas mixture, a plurality of blades extending radially outwards from the impeller, a channel disposed within the impeller in communication with the gas inlet and extending between adjacent pairs of the blades, the blades including a plurality of steps positioned at differing radial distances from an axis of rotation of the impeller, the steps defining the impeller flow paths for ejecting the feed gas mixture from the channel at a plurality of different angular momentums; and a plurality of diffusers in communication with the channel for providing the different feed gas pressure levels of the feed gas mixture.

12. The gas separation system according to claim 11, wherein at least one of the diffusers comprises a diffuser inlet for receiving a portion of the ejected feed gas mixture, a plurality of diffuser outlets, and a plurality of diffuser flow paths extending between the diffuser inlet and the diffuser outlets for providing the different feed gas pressure levels.

13. The gas separation system according to claim 12, wherein the diffuser flow paths comprise a primary diffuser channel opening into one of the diffuser outlets, a secondary channel opening into another of the diffuser outlets, and an aperture provided in the primary diffuser channel for diverting a boundary gas flow layer from the primary channel into the secondary channel so as to deliver gas from the secondary channel at a reduced pressure from the primary channel.

14. The gas separation system according to claim 3, wherein the split stream centrifugal compressor comprises a gas inlet for receiving the feed gas mixture, a plurality of blades extending radially outwards from the impeller, a channel disposed within the impeller in communication with the gas inlet and extending between adjacent pairs of the blades, the blades having respective blade angles defining the impeller flow paths for ejecting gas flows of the feed gas mixture from the channel at a plurality of different angular momentums; and a plurality of diffusers in communication with the channel for providing the different feed gas pressure levels of the feed gas mixture.

15. The gas separation system according to claim 14, wherein the blades each have a height, and the respective blade angle changes over the respective blade height.

16. The gas separation system according to claim 14, wherein the channel includes a plurality of compartments for maintaining separation of the feed gas mixture flows through the channel.

17. The gas separation system according to claim 14, wherein at least one of the diffusers comprises a diffuser inlet for receiving a portion of the ejected feed gas mixture, a plurality of diffuser outlets, and a plurality of diffuser flow paths extending between the diffuser inlet and the diffuser outlets for providing the different feed gas pressure levels.

18. The gas separation system according to claim 17, wherein the diffuser flow paths comprise a primary diffuser channel opening into one of the diffuser outlets, a secondary channel opening into another of the diffuser outlets, and an aperture provided in the primary diffuser channel for diverting a boundary gas flow layer from the primary channel into the secondary channel so as to deliver gas from the secondary channel at a reduced pressure from the primary channel.

19. The gas separation system according to claim 4, wherein the split stream centrifugal expander comprises a gas outlet for exhausting the first product gas, a plurality of blades extending radially outwards from the impeller, a channel disposed within the impeller in communication with the gas outlet and extending between adjacent pairs of the blades, and a plurality of diffusers for delivering the gas flows enriched in the first gas component to the channel at a plurality of different angular momentums, the blades including a plurality of steps positioned at differing radial distances from an axis of rotation of the impeller, the steps defining the impeller flow paths for producing the first product gas from the delivered gas flows.

20. The gas separation system according to claim 4, wherein the split stream centrifugal expander comprises a gas outlet for exhausting the first product gas, a plurality of blades extending radially outwards from the impeller, a channel disposed within the impeller in communication with the gas outlet and extending between adjacent pairs of the blades, and a plurality of diffusers for delivering the gas flows enriched in the first gas component to the channel at a plurality of different angular momentums, the blades having respective blade angles defining the impeller flow paths for producing the first product gas from the delivered gas flows.

21. The gas separation system according to claim 20, wherein the blades each have a height, and the respective blade angle changes over the respective blade height.

22. The gas separation system according to claim 20, wherein the channel includes a plurality of compartments for maintaining separation of the delivered gas mixtures through the channel.

23. The gas separation system according to claim 6, wherein the split stream centrifugal expander comprises a plurality of gas inlets for receiving gas flows of the gas enriched in the first gas component at the plurality of different exhaust gas pressure levels, a plurality of blades extending radially outwards from the impeller, a channel disposed within the impeller in communication with the gas inlets and extending between adjacent pairs of the blades, the blades having respective blade angles defining the impeller flow paths for ejecting the flows of the gas enriched in the first gas component from the channel at a common angular momentum; and a diffuser in communication with the channel for producing the first product gas from the ejected gas flows.

24. The gas separation system according to claim 23, wherein the blades each have a height, and the respective blade angle changes over the respective blade height.

25. The gas separation system according to claim 23, wherein at least one of the gas inlets includes swirl means for delivering the received gas flows to the channel with a swirl velocity.

26. The gas separation system according to claim 25, wherein the swirl means includes at least one of guide vanes, nozzles and volutes.

27. The gas separation system according to claim 23, wherein the channel includes a plurality of compartments for maintaining separation of the gas flows through the channel.

28. The gas separation system according to claim 6, wherein the split stream centrifugal expander comprises a plurality of gas inlets for receiving flows of the gas enriched in the first gas component at the plurality of different exhaust gas pressure levels, a plurality of blades extending radially outwards from the impeller, a channel disposed within the impeller in communication with the gas inlets and extending between adjacent pairs of the blades, the blades including a plurality of steps positioned at differing radial distances from an axis of rotation of the impeller, the steps defining the impeller flow paths for ejecting the flows of the gas enriched in the first gas component from the channel at a common angular momentum; and a diffuser in communication with the channel for producing the first product gas from the ejected gas flows.

29. The gas separation system according to claim 28, wherein at least one of the gas inlets includes swirl means for delivering the received gas flows to the channel with a swirl velocity.

30. The gas separation system according to claim 29, wherein the swirl means includes at least one of guide vanes, nozzles and volutes.

31. The gas separation system according to claim 8, wherein the light reflux expander comprises a plurality of blades extending radially outwards from the impeller, a channel disposed within the impeller extending between adjacent pairs of the blades, a plurality of gas inlets for directing flows of the gas enriched in the second gas component at the plurality of light reflux exit pressure levels to the channel, the channel including a plurality of steps positioned at differing radial distances from an axis of rotation of the impeller, the steps defining the impeller flow paths for ejecting the gas flows from the channel at a plurality of angular momentums, and a plurality of diffusers in communication with the channel for delivering each said ejected gas flow at a pressure level less than the respective light reflux exit pressure level.

32. The gas separation system according to claim 31, wherein the blades have blade angles, and the angular momentums are defined in accordance with the blade angles.

33. The gas separation system according to claim 31, wherein the channel includes an inlet end and an outlet end, and the steps are positioned at both said ends.

34. The gas separation system according to claim 31, wherein the channel includes a plurality of compartments for maintaining separation of the gas flows.

35. The gas separation system according to claim 1, wherein the impeller comprises a double-sided impeller, and the centrifugal turbomachinery includes a plurality of blades extending radially outwards from the impeller, a first gas inlet volute and a first gas outlet diffuser communicating with a first side of the impeller, a second gas inlet volute and a second gas outlet diffuser communicating with a second side of the impeller, a first channel disposed within the first side of the impeller communicating with the first gas inlet volute and the first gas outlet diffuser, and a second channel disposed within the second side of the impeller and communicating with the second gas inlet volute and the second gas outlet diffuser, the first and second channels each extending between adjacent pairs of the blades.

36. The gas separation system according to claim 35, wherein the impeller has an axis of rotation, and the first and second sides are disposed on opposite sides of the axis of rotation.

37. The gas separation system according to claim 35, wherein the blades include a plurality of steps positioned at differing radial distances from an axis of rotation of the impeller, the steps defining the impeller flow paths for ejecting gas flows from at least one of the channels at a plurality of different angular momentums.

38. The gas separation system according to claim 35, wherein the blades have respective blade angles defining the impeller flow paths for ejecting gas flows from at least one of the channels at a plurality of different angular momentums.

39. The gas separation system according to claim 35, wherein the centrifugal turbomachinery is configured as a split stream compressor for receiving feed gas at the inlet volutes at a common feed gas inlet pressure level and for delivering the received feed gas from the outlet diffusers to the first stator valve surface at a plurality of different feed gas pressure levels.

40. The gas separation system according to claim 35, wherein the centrifugal turbomachinery is configured as a split stream vacuum pump for receiving gas enriched in the first gas component at the inlet volutes at a plurality of different exhaust gas pressure levels and for ejecting the received gas as a first product gas from the outlet diffusers at a common first product gas pressure level.

41. The gas separation system according to claim 35, wherein the centrifugal turbomachinery is configured as a split stream centrifugal expander for receiving gas flows enriched in the second gas component at the inlet volutes at a plurality of different light reflux exit pressure levels and for discharging each said received gas flow at a pressure level less than the respective light reflux exit pressure level.

42. The gas separation system according to claim 35, wherein the centrifugal turbomachinery is configured as a split stream centrifugal expander for receiving gas flows enriched in the first gas component at the inlet volutes at a plurality of different exhaust pressure levels and for exhausting the received gas as a first product gas from the outlet diffusers at a common first product gas pressure level.

43. The gas separation system according to claim 1, wherein the impeller comprises a twin impeller comprising a first impeller portion and a second impeller portion coaxial and coupled to the first impeller portion, and the centrifugal turbomachinery includes a plurality of blades extending radially outwards from the impeller, a first gas inlet volute and a plurality of first gas outlet diffusers communicating with the first impeller portion, a plurality of second gas inlet volutes and a second gas outlet diffuser communicating with the impeller portion, a first channel disposed within the first impeller portion communicating with the first inlet volute and the first outlet diffusers, and a second channel disposed within the second impeller portion and communicating with the second inlet volutes and the second outlet diffuser, the first and second channels each extending between adjacent pairs of the blades.

44. The gas separation system according to claim 43, wherein the first impeller portion, the first inlet volute and the first outlet diffusers are configured together as a split stream centrifugal compressor for receiving feed gas at the first inlet volute and for delivering the received feed gas from the first outlet diffusers to the first stator valve surface at a plurality of different feed gas pressure levels, and the second impeller portion, the second inlet volutes and the second outlet diffuser are configured together as a split-stream expander for receiving gas flows enriched in the first gas component at the second inlet volutes at a plurality of different exhaust pressure levels and for exhausting the received gas flows as a first product gas from the outlet diffuser at a first product gas pressure level.

45. The gas separation system according to claim 43, wherein the first impeller portion, the first inlet volute and the first outlet diffusers are configured together as a split stream centrifugal compressor for receiving feed gas at the first inlet volute and for delivering the received feed gas from the first outlet diffusers to the first stator valve surface at a plurality of different feed gas pressure levels, and the second impeller portion, the second inlet volutes and the second outlet diffuser are configured together as a split-stream vacuum pump for receiving gas flows enriched in the first gas component at the second inlet volutes at a plurality of different exhaust pressure levels and for ejecting the received gas flows as a first product gas from the outlet diffuser at a first product gas pressure level.

46. The gas separation system according to claim 1, wherein the centrifugal turbomachinery includes a gas mixing nozzle for mixing blowdown gas flows from at least two of the function compartments, the blowdown gas flows being at different pressure levels.

47. The gas separation system according to claim 46, wherein the mixing nozzle comprises a nozzle housing, the impeller being rotatably disposed with the housing, the nozzle housing and the impeller defining an annular chamber therebetween, and at least two gas inlets coupled to respective ones of the function compartments for directing the blowdown gas flows tangentially into the annular chamber for mixing therein, the gas inlets receiving the blowdown gas flow at respective ones of the different pressure levels.

48. The gas separation system according to claim 46, wherein the mixing nozzle comprises at least two gas inlets for receiving the blowdown gas flows from respective ones of the function compartments, and a gas mixing section in communication with the gas inlets for combining together the received blowdown gas flows.

49. The gas separation system according to claim 1, wherein the centrifugal turbomachinery includes a diffuser comprising a primary channel for delivering a gas flow to one of the function compartments, and a secondary channel in communication with the primary channel for bleeding off a lower energy boundary gas layer from the delivered gas flow.

* * * * *

UNITED STATES PATENT AND TRADEMARK OFFICE
CERTIFICATE OF CORRECTION

PATENT NO.   : 6,398,853 B1
DATED        : June 4, 2002
INVENTOR(S)  : Keefer et al.

It is certified that error appears in the above-identified patent and that said Letters Patent is hereby corrected as shown below:

Title page,
Item [63], Related U.S. Application Data, should read
-- U.S. Patent Application No. 60/112,228, filed December 16, 1998 --.

Column 1,
Line 5, "The present invention" shoud read -- This application claims benefit of U.S. Patent Application No. 60/112,228, filed December 16, 1998, entitled GAS SEPARATION WITH SPLIT STREAM CENTRIFUGAL TURBOMACHINERY. The present invention --.

Signed and Sealed this

Tenth Day of February, 2004

JON W. DUDAS
*Acting Director of the United States Patent and Trademark Office*